United States Patent
Chiang et al.

(10) Patent No.: US 11,699,452 B2
(45) Date of Patent: Jul. 11, 2023

(54) MACHINE LEARNING-BASED AUDIO CODEC SWITCHING

(71) Applicant: T-Mobile USA, Inc., Bellevue, WA (US)

(72) Inventors: Hsin Fu Henry Chiang, Bellevue, WA (US); Yasmin Karimli, Kirkland, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 163 days.

(21) Appl. No.: 17/115,463

(22) Filed: Dec. 8, 2020

(65) Prior Publication Data

US 2022/0180883 A1 Jun. 9, 2022

(51) Int. Cl.
*G10L 19/22* (2013.01)
*H04W 76/10* (2018.01)
*G10L 19/02* (2013.01)
*G10L 25/51* (2013.01)

(52) U.S. Cl.
CPC .......... *G10L 19/22* (2013.01); *G10L 19/0208* (2013.01); *G10L 25/51* (2013.01); *H04W 76/10* (2018.02)

(58) Field of Classification Search
CPC ..... G10L 19/22; G10L 19/0208; G10L 25/51; H04W 76/10
See application file for complete search history.

(56) References Cited

U.S. PATENT DOCUMENTS

| | | | |
|---|---|---|---|
| 9,591,048 B2 | 3/2017 | Torgersrud et al. | |
| 9,860,766 B1* | 1/2018 | Pawar | H04W 24/02 |
| 10,904,798 B2* | 1/2021 | Choi | H04L 65/102 |
| 2014/0067405 A1 | 3/2014 | Patel et al. | |
| 2017/0092288 A1 | 3/2017 | Dewasurendra et al. | |
| 2017/0346954 A1 | 11/2017 | Wang et al. | |
| 2018/0206087 A1 | 7/2018 | Guan et al. | |
| 2018/0302515 A1* | 10/2018 | Li | H04M 7/0072 |
| 2018/0376004 A1* | 12/2018 | Kodali | H04W 24/08 |

(Continued)

OTHER PUBLICATIONS

Dietz et al., "Overview of the EVS codec architecture," 2015 IEEE International Conference on Acoustics, Speech and Signal Processing (ICASSP), 2015, pp. 5698-5702, doi: 10.1109/ICASSP.2015.7179063. (Year: 2015).*

(Continued)

*Primary Examiner* — Michelle M Koeth
(74) *Attorney, Agent, or Firm* — Lee & Hayes, P.C.

(57) ABSTRACT

Described herein are techniques, devices, and systems for selectively using a music-capable audio codec on-demand during a communication session. A user equipment (UE) may adaptively transition between using a first audio codec that provides a first audio bandwidth and a second audio codec (e.g., the EVS-FB codec) that provides a second audio bandwidth that is greater than the first audio bandwidth. The transition to the second audio codec may occur in response to determining that sound in the environment of the UE includes frequencies outside of a range of frequencies associated with a human voice, such as by determining that music is being played in the environment of the UE, which allows for selectively using a music-capable audio codec when it would be beneficial to do so.

17 Claims, 17 Drawing Sheets

(56) References Cited

U.S. PATENT DOCUMENTS

2020/0236154 A1  7/2020 Ragot et al.
2022/0182495 A1  6/2022 Kwok et al.
2022/0394133 A1  12/2022 Kwok

OTHER PUBLICATIONS

Eksler et al., "Audio bandwidth detection in the EVS codec," 2015 IEEE Global Conference on Signal and Information Processing (GlobalSIP), 2015, pp. 488-492, doi: 10.1109/GlobalSIP.2015.7418243 (Year: 2015).*

Kang et al., "Improvement of Speech/Music Classification for 3GPP EVS Based on LSTM," Symmetry 2018, 10, 605, doi:10.3390/sym10110605 (Year: 2018).*

* cited by examiner

MACHINE LEARNING-BASED AUDIO CODEC SWITCHING

BACKGROUND

The Enhanced Voice Services (EVS) codec is an audio codec that provides high quality sound for voice, as well as for generic audio such as music, and content that mixes voice and music. The Full Band of EVS (EVS-FB) provides extended audio bandwidth up to 20 kilohertz (kHz), which provides significant quality improvement for music and other sounds that are outside of the frequencies of sounds that the human voice can make. However, using EVS-FB as an audio codec for voice calls is not always better. For example, EVS-FB may be less efficient than other audio codecs, and EVS-FB may consume more resources than necessary when voice is the only sound that matters. EVS-FB may also be unreliable in poor radio frequency (RF) conditions, such as when a user equipment (UE) moves farther from a cell site and close to the edge of the cell.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 3A illustrates upgrading to a greater audio bandwidth, and FIG. 3B illustrates downgrading to a lesser audio bandwidth.

FIG. 8A illustrates downgrading to a lesser audio bandwidth, and FIG. 8B illustrates upgrading to a greater audio bandwidth.

DETAILED DESCRIPTION

Figure 1A:
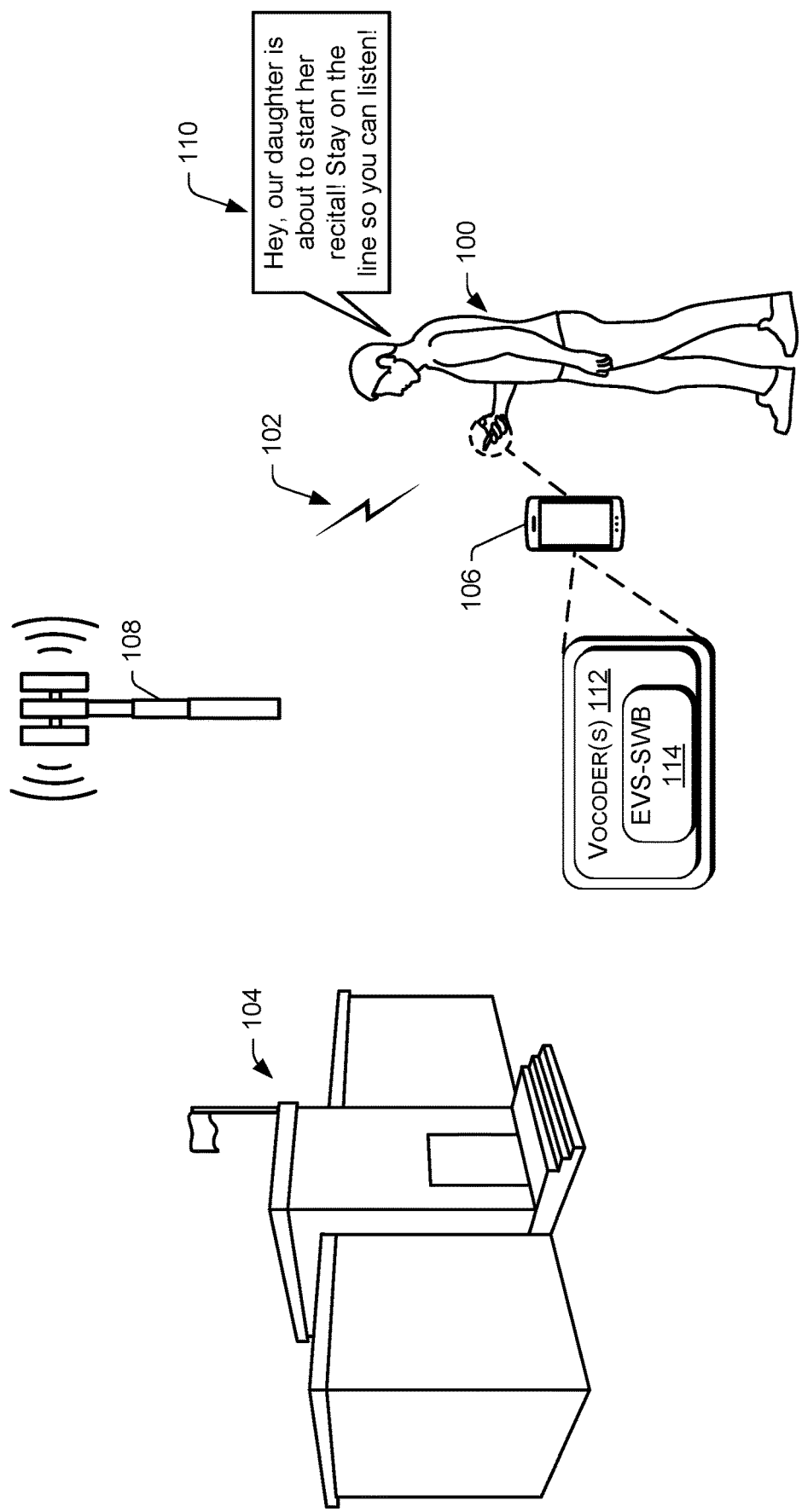
FIG. 1A is an example diagram illustrating a user on a voice call while the user is outside of a concert hall, in accordance with various embodiments. A user equipment (UE) depicted in FIG. 1A establishes the voice call using a first audio codec that provides a first audio bandwidth.

The Full Band of the Enhanced Voice Services codec (EVS-FB) provides a superior sound experience than other EVS codecs. For example, a first user can play music while on a call with second user, and while EVS-FB is used as the audio codec for the call, the music sounds much better and more realistic to the second user. However, this enhanced realism comes at the cost of using more resources, both on the UE and on the network. Accordingly, it may not be beneficial to always use EVS-FB as the audio codec for calls involving UEs, even if both UEs are capable of using the EVS-FB codec. For example, the EVS-FB codec may be less efficient than other audio codecs and/or unreliable in certain scenarios, as noted above.

Described herein are, among other things, techniques, devices, and systems for selectively using a music-capable audio codec on-demand during a communication session. Specifically, a UE may adaptively transition (or switch) between using a first audio codec (e.g., a first EVS audio codec) that provides a first audio bandwidth and a second audio codec (e.g., a second EVS audio codec) that provides a second audio bandwidth that is greater than the first audio bandwidth. In some examples, the first audio codec is a "less-than-full-band" EVS codec, such as the EVS Super Wideband (EVS-SWB) codec, the EVS Wideband (EVS-WB) codec, or even the EVS Narrowband (EVS-NB) codec. The second audio codec may be the EVS-FB codec. The transition to the second audio codec may occur in response to a machine-learned determination that sound in the environment of the UE includes frequencies outside of a range of frequencies associated with a human voice, such as by the UE using a machine learning model(s) and/or artificial intelligence to determine that music is being played in its environment. By adaptively transitioning between using these different audio codecs during an ongoing communication session, a music-capable audio codec that provides greater audio bandwidth (e.g., the EVS-FB codec) can be selectively utilized when it would be beneficial to do so, and other, less-than-full-band audio codecs can be utilized when it would not be beneficial to utilize the music-capable audio codec.

In an illustrative example, a UE may include logic (e.g., software, firmware, hardware, or a combination thereof) for detecting sound in an environment of the UE and determining what frequencies are included in the detected sound. This sound detection may be based on the output of a trained machine learning model(s) and/or an artificial intelligence algorithm, and the sound detection may occur during an ongoing communication session, such as a Voice over New Radio (VoNR) session. If the frequencies in the detected sound correspond to non-vocal frequencies that are outside of a range of frequencies associated with a human voice (e.g., frequencies produced by music), the logic of the UE may be configured to transition from using a first audio codec (e.g., a less-than-full-band EVS audio codec) to using a second audio codec that provides greater audio bandwidth (e.g., the EVS-FB codec). By continuing the communication session using the second (music-capable) audio codec, non-vocal sounds, such as music, can be delivered with high-quality over an Internet Protocol (IP)-based network.

To further illustrate, if a first user calls a second user while the first user is located outside of a concert hall, the call may be established using the EVS-SWB codec, for example, because it may not matter to the second user to hear non-vocal sounds in the environment of the first user (e.g., background noise), at least while the first user is located outside of the concert hall. Subsequently, the first user may walk into the concert hall, at which point a first UE of the first user detects music in the background, and the first UE, in response to detecting the background music, initiates a transition to using the EVS-FB codec, which provides an extended audio bandwidth that is better for music (or sound with a mixture of voice and music). In some implementations, when the UEs switch to using the EVS-FB codec, the transition can be automatic (i.e., without user intervention), or the transition can be semi-automatic, such as by outputting, via the UE, a user prompt that requests to transition from using the first audio codec to using the second audio codec. After receiving user input authorizing the UE to initiate the requested transition, the UEs may switch to using the second audio codec. For example, the first UE may send a message to a serving base station for transitioning to using the second audio codec, and both of the UEs involved in the communication session may continue the communication session using the second audio codec, assuming both UEs support the EVS-FB audio codec.

The techniques, devices, and systems described herein for adaptively transitioning between using different audio codecs may allow one or more devices to conserve resources with respect to processing resources, memory resources, networking resources, power resources, etc., in the various ways described herein. For example, by selectively using a music-capable audio codec (e.g., the EVS-FB codec) on-demand, such as in response to detecting music in the environment of the UE, a UE(s) and/or a network node (e.g., a base station(s)) may conserve processing resources, battery power, and the like, and network efficiency may also be improved by allocating less network bandwidth to handle the session traffic for a less-than-full-band EVS audio codec. In this manner, the use of a music-capable audio codec (e.g., EVS-FB) can be reserved for instances when it is most beneficial to use the music-capable audio codec, which allows for providing an improved user experience whenever the music-capable audio codec is being used, and for conserving computing resources and/or improving network efficiency whenever the music-capable audio codec is not being used. In some scenarios, UEs that are involved in an ongoing communication may switch back-and-forth multiple times between audio codecs in order to realize the aforementioned benefits.

Also described herein are techniques, devices, and systems for providing an optimal voice experience over varying radio frequency (RF) conditions while using EVS audio codecs. For example, logic of a UE may be configured to adaptively transition, during an ongoing communication session, from using a music-capable EVS codec (e.g., EVS-FB) as a default (or preferred) audio codec to using a different EVS audio codec that provides a decreased audio bandwidth (e.g., EVS-SWB with Channel Aware Mode (CAM)). The transition from using the music-capable codec to using the different EVS audio codec may be triggered, at least in part, by a degradation of a RF condition(s) below a particular threshold. By adaptively transitioning between using these different audio codecs during an ongoing communication session, at least a minimal level of voice quality can be maintained for a communication session while degraded the RF condition(s) are present.

To illustrate, two UEs involved in a communication session (e.g., a VoNR call) may each support using the EVS-FB codec. Accordingly, the communication session may be established using the EVS-FB codec as a default (or preferred) audio codec, and the UEs may continue to use the EVS-FB codec while a RF condition(s) is/are good (e.g., equal to or greater than a threshold(s) level). Examples of RF conditions that may be monitored include, without limitation, a radio signal strength indication (RSSI) parameter, a reference signal received power (RSRP) parameter, and/or a reference signal received quality (RSRQ) parameter, among other possible RF conditions. By using the EVS-FB codec during good (e.g., above-threshold) RF conditions, an optimal sound experience can be provided to the parties of the communication session. However, if at some point during the communication session the RF condition(s) associated with the serving base station degrades past a certain point, the logic of the UE may transition from using the EVS-FB codec to a less-than-full-band EVS audio codec, such as the EVS-SWB codec with CAM. In some implementations, the EVS-SWB codec may be used at a bit rate of about 13.2 kilobits per second (kbps), which is a bit rate that provides a notable link budget gain to the UEs involved in the communication session, as compared to using a legacy audio codec, such as Adaptive Multi-Rate Wideband (AMR-WB), and which is preferable to using the EVS-FB codec in degraded RF conditions. That is, it is better to transition from using the EVS-FB codec to using the EVS-SWB codec with CAM at a bit rate of about 13.2 kbps whenever RF conditions degrade past a certain point, because doing so provides a link budget gain (e.g., improved signal strength) to the UEs close to the cell edge, and because continuing the session using the EVS-FB codec may not provide an equivalent link budget gain in poor RF conditions. After transitioning to using the EVS-SWB codec, for example, the supreme sound experience that is offered by the EVS-FB codec is traded for a better-sounding voice call (e.g., better voice quality, so that one user can understand what the other user is saying). That is, in certain RF conditions, the EVS-FB codec is unable to provide a minimal level of voice quality in order to carry on an intelligible conversation because EVS-FB audio frames may be dropped or corrupted, which degrades the audio quality. These degraded RF conditions may occur if the UE moves away from the cell site and close to the cell edge where coverage is marginal, and/or if there is interference at a certain location of the UE.

The techniques, devices, and systems described herein for adaptively transitioning to using a less-than-full-band EVS audio codec (e.g., the EVS-SWB codec with CAM at a bit rate of about 13.2 kbps) in degraded RF conditions allows for maintaining at least a minimal level of voice quality for a communication session. This is due, in part, to the fact that the EVS-SWB codec with CAM provides partial audio packet redundancy through audio frame replication, which provides extra protection to audio payloads, which, in turn, provides better audio quality for voice in poor RF conditions, as compared to using the EVS-FB codec in the same, or similar, RF conditions.

Also disclosed herein are systems comprising one or more processors and one or more memories, as well as non-transitory computer-readable media storing computer-executable instructions that, when executed, by one or more processors perform various acts and/or processes disclosed herein.

FIG. 1A is an example diagram illustrating a user 100 on a call 102 (e.g., a VoNR session) while the user 100 is located outside of a concert hall 104. The user 100 is holding a user equipment (UE) 106 and is using the UE 106 to establish the call 102 via a base station 108. The base station 108 may comprise any suitable type of cellular-based, and/or wireless-based, access point (e.g., a Next Generation Node B (gNB), an E-UTRAN Node B (eNodeB or eNB), etc.). In accordance with various embodiments described herein, the terms "cell site," "cell tower," "base station," "gNB," "eNodeB," and "eNB," and may be used interchangeably herein to describe any base station 108 capable of acting as a serving base station. The base station 108 may be capable of communicating wirelessly using any suitable wireless communications/data technology, protocol, or standard, such as Global System for Mobile Communications (GSM), Time Division Multiple Access (TDMA), Universal Mobile Telecommunications System (UNITS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), voice over New Radio (VoNR)—e.g., 5G, IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

Figure 1B:
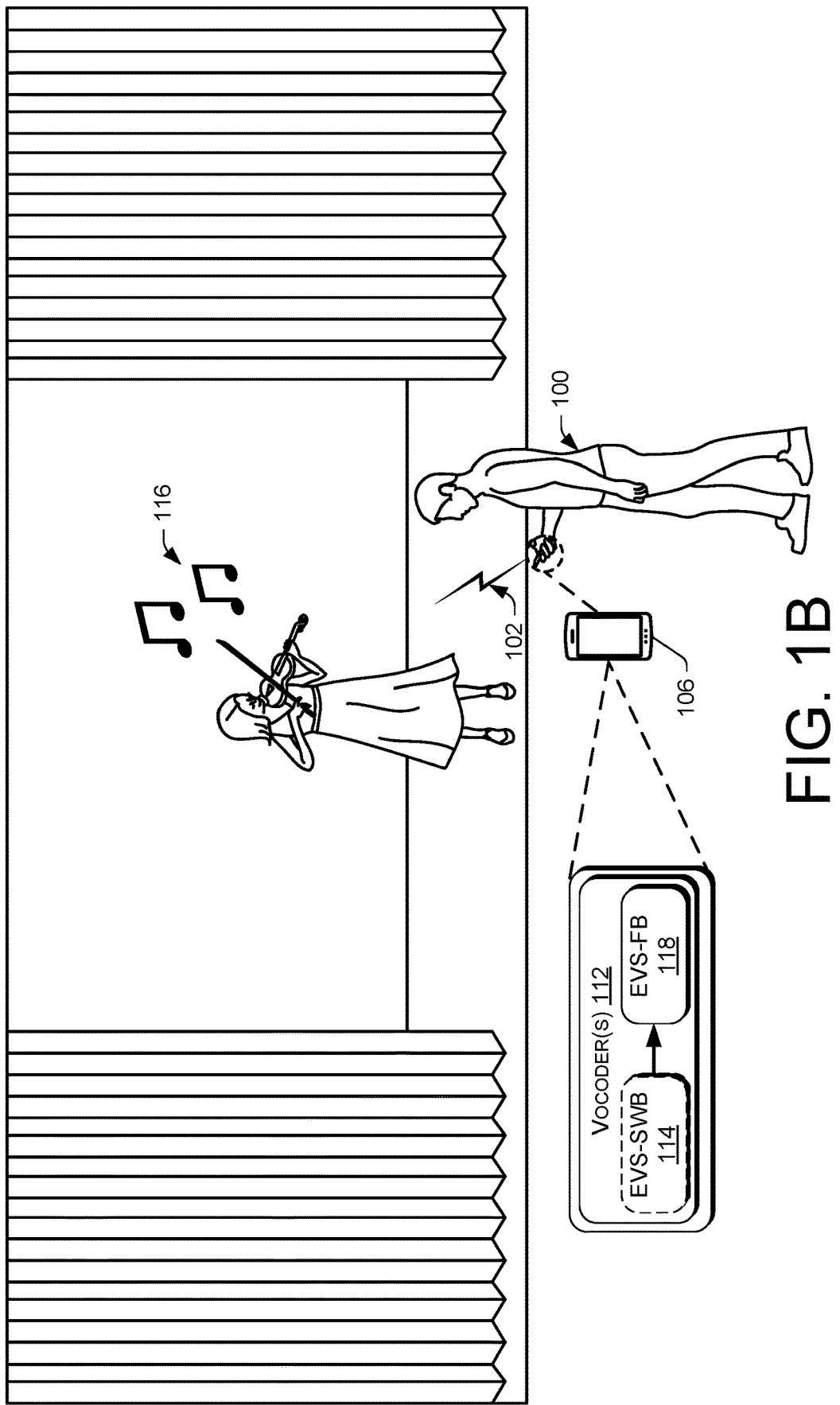
FIG. 1B is an example diagram illustrating the user depicted in FIG. 1A on the same voice call while inside the concert hall, in accordance with various embodiments. The UE depicted in FIG. 1B transitions from using the first audio codec to using a second audio codec that provides a second audio bandwidth greater than the first audio bandwidth. This transition occurs in response to detecting non-vocal frequencies (e.g., music) in the environment.

The UE 106 depicted in FIGS. 1A and 1B may be implemented as any suitable computing device configured to communicate over a wireless network, including, without limitation, a mobile phone (e.g., a smart phone), a tablet computer, a laptop computer, a portable digital assistant (PDA), a wearable computer (e.g., electronic/smart glasses, a head-mounted display (HMD), a smart watch, fitness trackers, etc.), and/or any similar UE. In accordance with various embodiments described herein, the terms "wireless communication device," "wireless device," "communication device," "mobile device," "computing device," "electronic device," "user device," and "user equipment (UE)" may be used interchangeably herein to describe any UE 106 capable of performing the techniques and processes described herein. Furthermore, the UE 106 depicted in FIGS. 1A and 1B may be capable of communicating wirelessly using any suitable wireless communications/data technology, protocol, or standard, such as GSM, TDMA, UMTS, EVDO, LTE, LTE+, GAN, UMA, CDMA, OFDM, GPRS, EDGE, AMPS, HSPA, HSPA+, VoIP, VoLTE, VoNR—e.g., 5G, IEEE 802.1x protocols, WiMAX, Wi-Fi, DOCSIS, DSL, and/or any future IP-based network technology or evolution of an existing IP-based network technology.

Referring to FIG. 1A, the base station 108 may act as a "serving base station" (or "serving cell") for the UE 106, meaning that the base station 108 depicted in FIG. 1A may be currently providing the UE 106 with access to a telecommunication network, and/or that the base station 108 may be actively setting up a communication session for the UE 106 to provision such network access. In the illustrative example of FIG. 1A, the UE 106 has established a call 102 (e.g., a VoNR call), and the user 100 may be talking to another user on the other end of the call 102. For example, the user 100 might call his wife to say (as shown in speech bubble 110): "Hey, our daughter is about to start her recital! Stay on the line so you can listen!." In this example, the user 100 intends to bring the UE 106 inside the concert hall 104 so that his wife can listen to their daughter play music over the phone, during the ongoing call 102.

FIG. 1A also illustrates that the UE 106 includes a vocoder(s) 112, which may represent logic (e.g., software, firmware, hardware, or a combination thereof) for encoding audio data generated using a microphone of the UE 106 before it is transmitted to the serving base station 108, and for decoding audio data that the UE 106 receives from the base station 108. The vocoder(s) 112 depicted in FIG. 1A has established the call 102 using a first audio codec, which, in the example of FIG. 1A, is the Enhanced Voice Services Super Wideband (EVS-SWB) codec. EVS is an audio codec standardized in the $3^{rd}$ Generation Partnership Project (3GPP) standard. EVS provides better capacity than its predecessor audio codecs, such as AMR, as well as better quality, and improved error resilience. Under the EVS "umbrella," there are four specific types of EVS audio codecs, which are shown in Table 1, below, along with their respective audio bandwidths, sampling rates, and bit rates:

TABLE 1

| EVS Codec | Audio bandwidth (sampling rate) | Bit rate |
| --- | --- | --- |
| Full Band (FB) | 20 Hz to 20 kHz (48 kHz) | 16.4 to 128 kbps |
| Super Wideband (SWB) | 50 Hz to 14k Hz (32 kHz) | 9.6 to 128 kbps |
| Wideband (WB) | 50 Hz to 7 kHz (16 kHz) | 5.9 to 128 kbps |
| Narrowband (NB) | 200 Hz to 3.4 kHz (8 kHz) | 5.9 to 24.4 kbps |

A UE, such as the UE 106, may use Session Initiation Protocol (SIP) to establish a communication session, such as the call 102, via the serving base station 108. SIP is a signaling protocol that can be used to establish, modify, and terminate communication sessions over packet networks, and to authenticate access to IP Multimedia Subsystem (IMS)-based services. As used herein, a "SIP request" is a message that is sent from a UE 106 to the IMS core of the telecommunications network using SIP protocol, and a "SIP response" is a message that is sent from the IMS core of the telecommunications network to a UE 106 using SIP protocol.

To establish the call 102 depicted in FIG. 1A, the UE 106 (in an example where the UE 106 is acting as an originating UE) may send a session request, such as a SIP message using the SIP INVITE method, via the serving base station 108. The session request is sent to request establishment of the call 102 with a terminating device, such as another UE. The UE 106 may also send a Session Description Protocol (SDP) offer as part of this session request to specify, among other things, particular codecs, including audio codecs, that are supported by the UE 106. The audio codecs supported by the UE 106 may be listed in order of preference, the first codec in the list being a preferred audio codec (or a default audio codec) that is used by default if the terminating device also supports the preferred audio codec, and if the RF conditions are good enough to use the preferred audio codec. In the example of FIG. 1A, the UE 106 may list the EVS-SWB codec 114 as the first audio codec in the list of supported audio codecs, which indicates that the EVS-SWB codec 114 is a preferred audio codec over other supported audio codecs, such as other EVS audio codecs. Accordingly, the call 102 may be established using the EVS-SWB codec 114 as a first audio codec. As indicated in Table 1, above, the EVS-SWB codec 114 provides a first audio bandwidth of 50 hertz (Hz) to 14 kilohertz (kHz). This is sufficient audio bandwidth to deliver speech content over an IP-based network. Accordingly, the EVS-SWB codec 114 can be utilized while the user 100 is outside of the concert hall 104 and while there is no music being played in the background (i.e., in an environment of the UE 106).

The UE 106 may be further configured to execute an algorithm to adaptively transition between audio codecs used by the UE 106 during an ongoing communication session, such as the call 102. In some implementations, the transitioning between audio codecs may be triggered by detecting sound in the environment of the UE 106 and by determining the frequencies that are included in the detected sound. In the example of FIG. 1A, the UE 106 may establish the call 102 using the EVS-SWB codec 114 as a default (or preferred) audio codec in order to conserve resources, unless and until the UE 106 determines that it would be beneficial to switch to using a music-capable audio codec, such as the EVS-FB codec. One way of making this determination is for the UE 106 to include logic that determines, based on audio data generated from sound in the environment of the UE 106, whether the sound includes frequencies that are outside of a range of frequencies associated with a human voice. In some examples, this range of frequencies may be a predetermined range of about 300 Hz to 3.4 kHz. In some examples, the determination made by the UE 106 is to determine whether music is playing in the environment of the UE 106. In the example of FIG. 1A, the logic of the UE 106 does not detect such out-of-range frequencies (e.g., music) in the environment of the UE 106, so the UE 106 continues to use the first audio codec, which is the EVS-SWB codec 114 in the example of FIG. 1A. One example reason for using the EVS-SWB codec 114 in the scenario of FIG. 1A is because a less-than-full-band EVS audio codec can be used with CAM, which provides the best coverage and efficiency, which helps to provide better voice quality when herein non-vocal sounds does not matter to the user on the other end of the call 102.

Turning to FIG. 1B, the user 100 depicted in FIG. 1A is still on the same call 102, but the user 100 has now entered the concert hall 104, and the user's 100 daughter is playing the violin on stage as part of a music recital. During the ongoing call 102, the UE 106 continuously generates audio data based on sound in the environment of the UE 106. If the user 100 is talking, some of this sound may represent speech uttered by the user 100, and that speech will most likely be in a typical vocal range of frequencies (e.g., within a range of about 300 Hz to 3.4 kHz). However, as depicted in FIG. 1B, at least some of the sound in the environment of the UE 106 may include music frequencies 116 that are outside of the range of frequencies associated with a human voice (e.g., the music frequencies 116 created by the violin may be outside of a range of about 300 Hz to 3.4 kHz). Accordingly, the vocoder(s) 112 of the UE 106 may determine, based at least in part on the audio data generated by the UE 106 while inside of the concert hall 104, that the sound in the environment of the UE 106 includes frequencies that are outside of vocal-frequencies (e.g., music frequencies 116). In some examples, the vocoder(s) 112 specifically determines that music is being played in the environment of the UE 106 based on the generated audio data.

Based at least in part on determining that the sound in the environment includes the frequencies 116 that are outside of the range of frequencies associated with the human voice (e.g., based on determining that music is being played in the environment), the UE 106 depicted in FIG. 1B may initiate a transition from using the first audio codec (e.g., the EVS-SWB codec 114) to using a second audio codec that provides a second audio bandwidth greater than the first audio bandwidth provided by the first audio codec. For example, the second audio codec may be the EVS-FB codec 118. As indicated in Table 1, above, the EVS-FB codec 118 provides a second audio bandwidth of 20 Hz to 20 kHz, which is greater than the first audio bandwidth of 50 Hz to 14 kHz provided by the EVS-SWB codec 114. As used herein, a second audio bandwidth is "greater than" a first audio bandwidth if the frequency range corresponding to the second audio bandwidth is larger than the frequency range corresponding to the first audio bandwidth.

In order to initiate the audio codec transition shown in FIG. 1B, the UE 106 may send a message to the serving base station 108 for transitioning from using the first audio codec (e.g., the EVS-SWB codec 114) to using a second audio codec (e.g., the EVS-FB codec 118). In some examples, the message sent to the serving base station 108 may include a payload header that specifies the target (second) audio codec (e.g., the EVS-FB codec 118). In some examples, the message includes a SDP offer and the message is sent using Real-time Transport Control Protocol (RTCP), such as an application-defined RTCP packet(s) (a RTCP-APP packet (s)). If the terminating device (e.g., the UE being used by the wife of the user 100) does not support the target (second) audio codec (e.g., if the user's 100 wife is using a legacy UE), the call 102 may continue using the "lowest common denominator" audio codec, which may be the EVS-SWB codec 114, in the example of FIGS. 1A and 1B. However, assuming that the terminating device also supports the target (second) audio codec, the UE 106 can continue the call 102 using the second audio codec (e.g., the EVS-FB codec 118). In this way, the user on the other end of the call 102 (e.g., the user's 100 wife) can experience the music frequencies 116 with higher-fidelity and/or higher-quality by using the EVS-FB codec 118, and the user's 100 wife may feel as though she is physically present inside the concert hall 104, listening to her daughter play the violin.

If the user 100 were to subsequently walk out of the concert hall 104, the UE 106 may be configured to transition audio codecs in the opposite direction. That is, the UE 106 may be configured to transition from using the second audio codec (e.g., the EVS-FB codec 118) to using the first audio codec (e.g., the EVS-SWB codec 114) upon detecting sound in the environment that no longer includes the out-of-range frequencies (e.g., the music frequencies 116). Accordingly, once the user 100 moves outside of the concert hall 104 while carrying the UE 106, and while the UE 106 is still on the call 102, the UE 106 may send a second message to the serving base station 108 for transitioning from using the second audio codec (e.g., the EVS-FB codec 118) to using the first audio codec (e.g., the EVS-SWB codec 114) once again. In this manner, resources are conserved by using the music-capable audio codec (e.g., the EVS-FB codec 118) selectively (e.g., on-demand, as-needed, etc.). It is to be appreciated that other triggers besides ceasing to detect background music may initiate the transition in the opposite direction (e.g., transitioning from using the EVS-FB codec 118 to using the EVS-SWB codec 114). For example, if a RF condition(s) falls below a predefined threshold, the UE 106 may transition back to the lesser audio bandwidth audio codec. For example, if a RSSI value, a RSRP value, and/or a RSRQ value determined (e.g., measured) by the UE 106 falls below a threshold value(s), the UE 106 may determine that it is no longer efficient to continue using the music-capable audio codec (e.g., the EVS-FB codec 118), and that voice quality may be improved by transitioning back to using the EVS-SWB codec 114.

Figure 2:
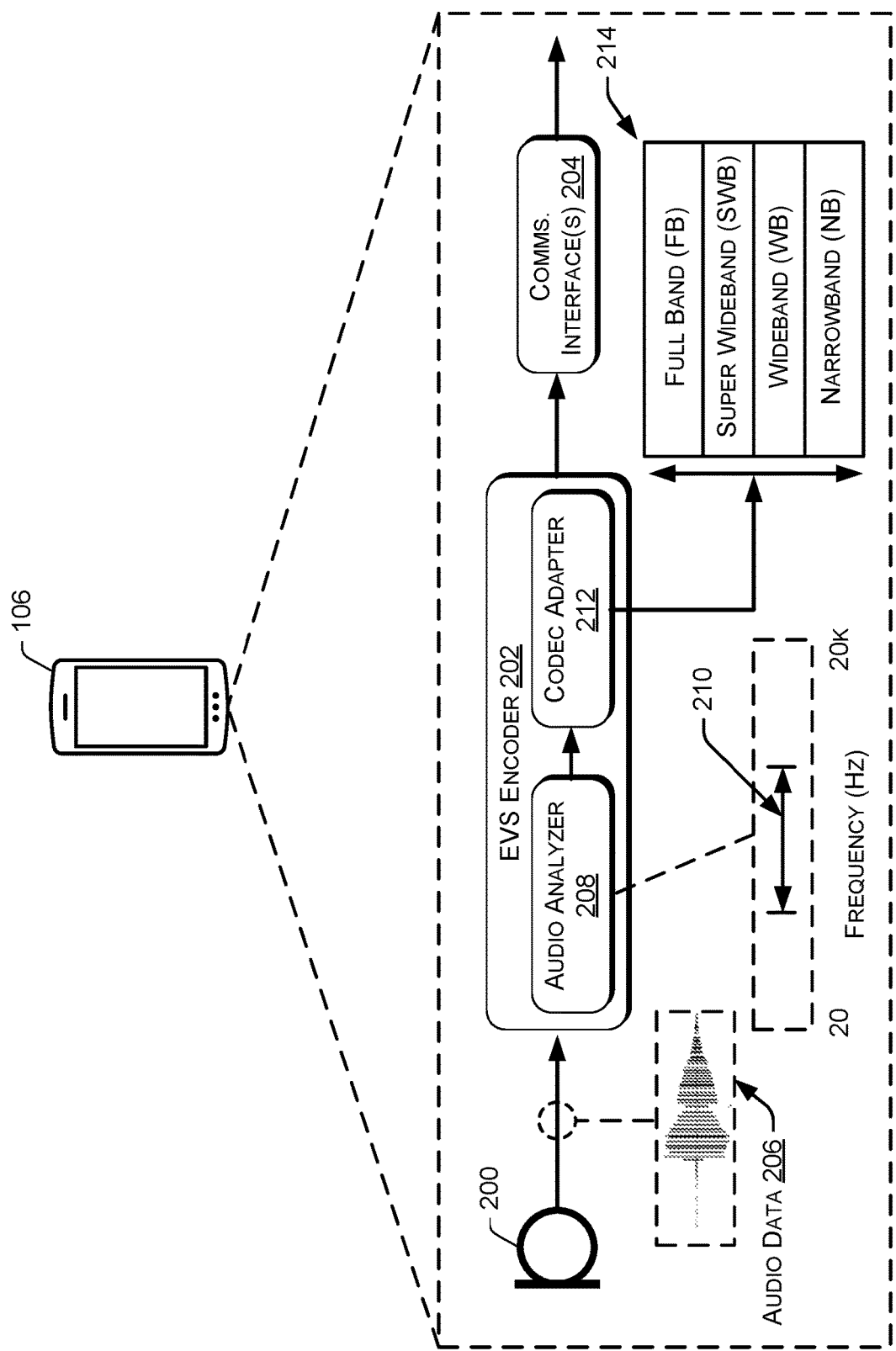
FIG. 2 illustrates example components of the UE of FIGS. 1A and 1B, as well as a technique for adaptively transitioning between audio codecs used by the UE during an ongoing communication session, in accordance with various embodiments.

FIG. 2 illustrates example components of the UE 106 of FIGS. 1A and 1B, as well as a technique for adaptively transitioning between audio codecs used by the UE 106 during an ongoing communication session, in accordance with various embodiments. As shown in FIG. 2, the UE 106 may include one or more microphones 200, an EVS encoder 202, and a communications (comms.) interface(s) 204. The microphone(s) 200 may be configured to capture sound and to convert the sound into digital audio data 206. The microphone(s) 200 may represent a microphone array, such as a beamforming array. The conversion of the sound into digital audio data 206 may include using analogue-to-digital (A/D) conversion. The audio data 206 may be generated as one or more audio samples.

The EVS encoder 202 may represent the encoding part of the vocoder(s) 112 depicted in FIGS. 1A and 1B, which may also include an EVS decoder (not shown). In some examples, the EVS encoder 202 may include a multi-rate audio encoder optimized for operation with voice and music/mixed content signals. Furthermore, the EVS encoder 202 may be interoperable with AMR codecs. The EVS encoder 202 is configured to receive, as input, the audio data 206 generated based on sound in an environment of the UE 106. An audio analyzer 208 of the EVS encoder 202 may analyze the audio data 206 to determine whether the sound in the environment of the UE 106 includes frequencies outside of a range of frequencies 210 associated with a human voice, which may be a predetermined range that is stored in local memory of the UE 106. As mentioned above, the range of frequencies 210 may be about 300 Hz to 3.4 kHz, which represents a center portion of the audio bandwidth provided by the EVS-FB codec 118. In some implementations, frequencies that are within the range of frequencies 210 (e.g., vocal frequencies) are subtracted or removed from the audio data 206 before the audio data 206 is processed by the audio analyzer 208. This removal of vocal frequencies may allow for isolating the frequencies of interest, such as non-vocal frequencies (e.g., music), and/or it may otherwise remove unwanted noise emanating from the speaker of the UE 106 itself (e.g., the voice of the other user on the call 102 being output from the speaker of the UE 106). In some implementations, the audio analyzer 208 is configured to determine, based on an analysis of the audio data 206, whether music is being played in the environment of the UE 106. In some implementations, the audio analyzer 208 may process each audio sample it receives. In other implementations, the audio analyzer 208 may process some, but not all, of the audio samples in the audio data 206 generated by the UE 106. For instance, the audio analyzer 208 may analyze audio data 206 in response to an instruction or an event, and/or at any suitable frequency or schedule (e.g., every few seconds) in order to conserve resources.

The audio analyzer 208 may use any suitable algorithm or technology to make a determination based on the audio data 206 generated by the UE 106. In some implementations, the audio analyzer 208 uses machine learning and/or artificial intelligence to make a determination. Machine learning generally involves processing a set of examples (called "training data") in order to train a machine learning model (s). A machine learning model(s), once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model can be trained to infer a probability, or a set of probabilities, for a classification task based on unknown data received as input. In the context of the present disclosure, the unknown input may include the audio data 206 (e.g., one or more audio data samples) that represents sound in the environment of the UE 106, and the trained machine learning model(s) may be tasked with outputting a probability of the sound including frequencies outside of a range of frequencies 210 associated with a human voice. In some implementations, the trained machine learning model(s) may output a probability that music is being played in the environment. Because music is just one example type of sound that may be of interest to a user involved in a communication session, the machine learning model(s) may be trained to detect other types of non-vocal (or non-speech) sounds of interest. In the example where the sound of interest is music, the machine learning model(s) may be trained to distinguish background music from other non-vocal (or non-speech) background noises (e.g., a cat meowing in the vicinity of the UE 106, a motorcycle driving by the UE 106, etc.). In some implementations, the machine learning model(s) may be trained to distinguish between background music at various decibel levels, which may allow for detecting music in an environment when music is intended to be conveyed as a sound of interest, and not detecting music when music is not intended to be conveyed as a sound of interest, even when music is softly playing in the background (e.g., when the user 100 is in an elevator with music. In some embodiments, the probability output from the trained machine learning model(s) is a variable that is normalized in the range of [0,1]. In some implementations, the trained machine learning model(s) may output a set of probabilities (e.g., two probabilities), where one probability relates to the probability of music being played in the background, and the other probability relates to the probability of music not being played in the background. The probability that is output by the trained machine learning model(s) can relate to either of these probabilities (detected music or no detected music) to indicate a level of confidence that there is or is not music in the background.

A trained machine learning model(s) used by the audio analyzer 208 may represent a single model or an ensemble of base-level machine learning models, and may be implemented as any type of machine learning model. For example, suitable machine learning models for use by the audio analyzer 208 include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The training data that is used to train a machine learning model for detecting background music may include various types of data. In general, training data for machine learning can include two components: features and labels. However, the training data used to train a machine learning model(s) used by the audio analyzer 208 may be unlabeled, in some embodiments. Accordingly, the machine learning model(s) used by the audio analyzer 208 may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the training data. As part of the training process, weights may be set for machine learning. These weights may apply to a set of features included in the training data. In some embodiments, the weights that are set during the training process may apply to parameters that are internal to the machine learning model(s) (e.g., weights for neurons in a hidden-layer of a neural network). These internal parameters of the machine learning model(s) may or may not map one-to-one with individual input features of the set of features. The weights can indicate the influence that any given feature or parameter has on the probability that is output by the trained machine learning model.

In some implementations, the audio analyzer 208 may be configured to send audio data 206 to a remote audio processing system over a computer network (e.g., over the telecommunication network via the serving base station 108) in real-time, and the remote audio processing system, which is remotely located from the UE 106, may process the audio data 206 (e.g., using machine learning techniques, as described herein) to make a determination as to whether music is being played in an environment of the UE 106, and the remote system may send information and/or an instruction to the UE 106 that indicates whether music is being played in the environment of the UE 106 and/or that instructs the UE 106 to adaptively transition to a different audio codec. An example network-side process 1100 that may be implemented by such a remote audio processing system is described with reference to FIG. 11, below.

In either scenario (i.e., local processing or remote processing scenarios), if the audio analyzer 208 determines to transition to a different audio codec, the output of the audio analyzer 208 may be provided to a codec adapter 212 of the EVS encoder 202. In some implementations, the output of the audio analyzer 208 instructs the codec adapter 212 to transition to a particular audio codec, such as by specifying the EVS-FB codec 118, or another codec that is the target audio codec. In other implementations, the output of the audio analyzer 208 informs the codec adapter 212 as to which frequencies are included in the sound in the environment of the UE 106 (e.g., if music frequencies 116 are detected), and the codec adapter 212 selects the appropriate audio codec for the detected frequencies output by the audio analyzer 208. FIG. 2 illustrates available EVS audio codecs 214 that may be selected by the codec adapter 212. For example, the codec adapter 212 may select the EVS-FB codec, the EVS-SWB codec, the EVS-WB codec, or the EVS-NB codec as the target audio codec. In the illustrative example of FIGS. 1A and 1B, the UE 106 may be involved in a communication session (e.g., a call 102) using the EVS-SWB codec 114, and the codec adapter 212 may select the EVS-FB codec 118 from the list of available EVS audio codecs 214 based on output received from the audio analyzer 208, which may indicate that music is playing in the background, or which may otherwise instruct the codec adapter 212 to transition to using the EVS-FB codec 118.

To initiate the transition to the target audio codec, the output of the codec adapter 212 may be received by the communications interface(s) 204, which may include a payload formatter that is configured to send a message to the serving base station 108 for transitioning from using the current audio codec to using a target audio codec that provides a different audio bandwidth than the audio bandwidth provided by the current audio codec.

Although machine learning and/or artificial intelligence is provided as an example technique that may be used by the audio analyzer 208 to detect music being played in an environment of the UE 106, it is to be appreciated that other non-machine learning techniques may be utilized to determine that music is being played in the environment of the UE 106. For example, the audio analyzer 208 may be configured to analyze the frequencies in the audio data 206 and compare the identified frequencies to the range of frequencies 210 to determine if any frequencies are outside of the range of frequencies 210. In some implementations, the audio analyzer 208 may determine if a loudness (e.g., measured in decibels (dB)) of those out-of-range frequencies are above a threshold loudness to avoid switching audio codecs in situations where the out-of-range frequencies are unlikely to be of interest to a user on the other end of the call 102 (e.g., noise from street traffic, wind, or even quiet music, such as elevator music, etc.). Furthermore, as will be described in more detail below, the audio analyzer 208 may be configured to cause the UE 106 to output a user prompt as a way of allowing the user 100 to make the final determination as to whether the audio codec is to be switched in the middle of a communication session.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3A:
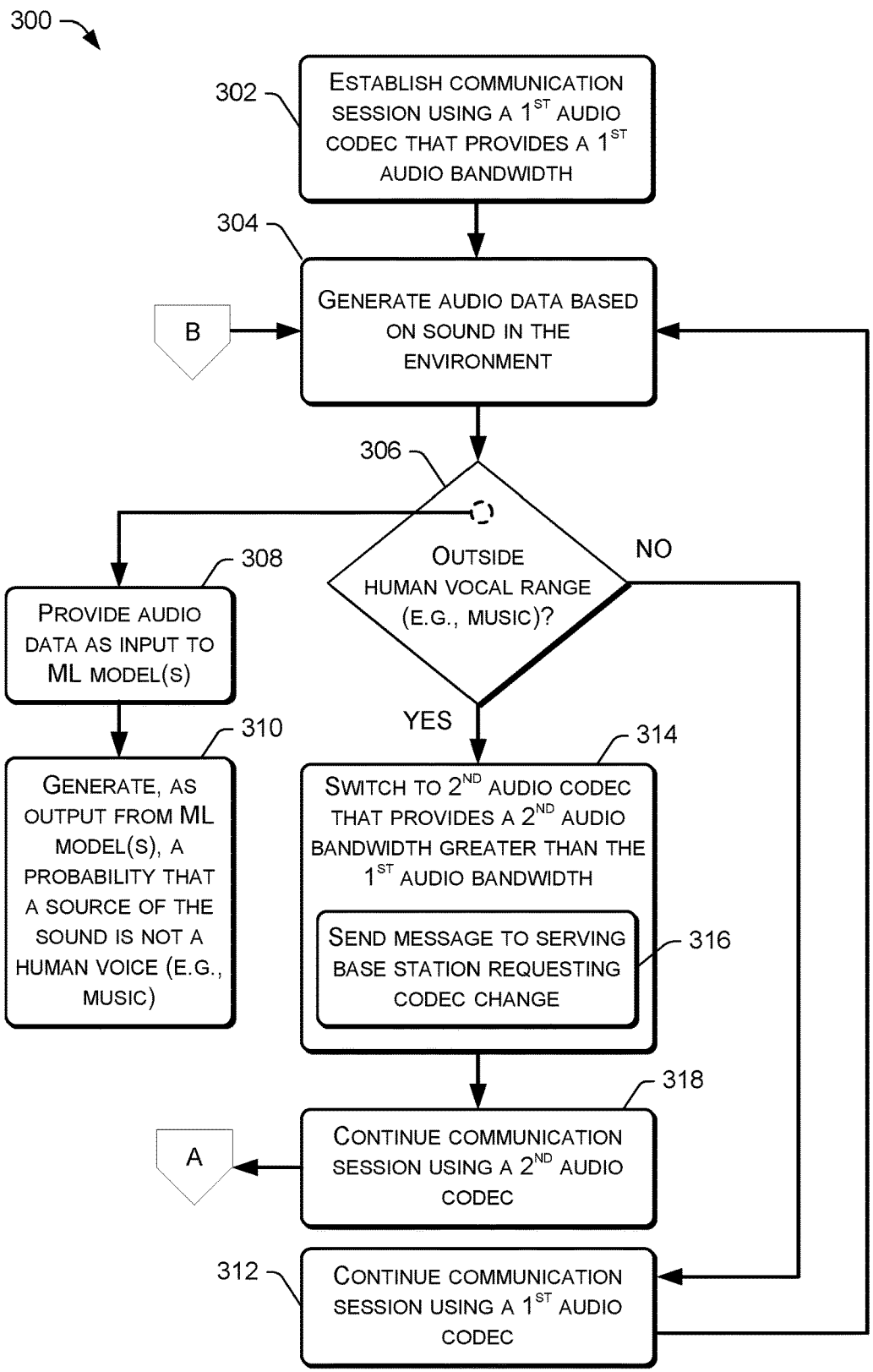
FIGS. 3A and 3B illustrate a flowchart of an example process for adaptively transitioning between audio codecs used by the UE during an ongoing communication session, in accordance with various embodiments.
Figure 3B:
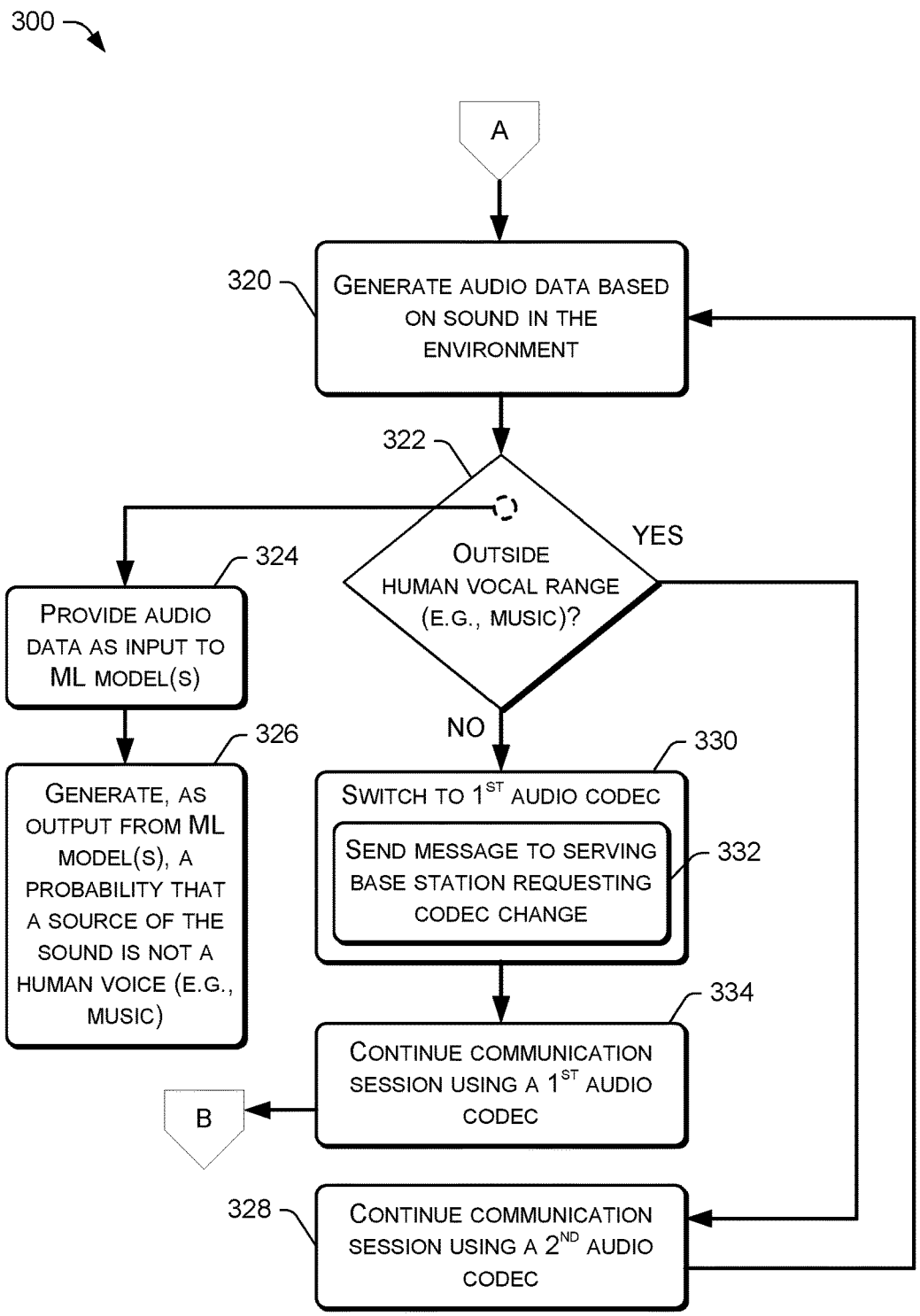

FIGS. 3A and 3B illustrate a flowchart of an example process 300 for adaptively transitioning between audio codecs used by the UE 106 during an ongoing communication session, in accordance with various embodiments. FIG. 3A illustrates upgrading to a greater audio bandwidth, and FIG. 3B illustrates downgrading to a lesser audio bandwidth. For discussion purposes, reference is made to the previous figure(s) in describing the process 300.

At 302, a UE 106 may establish, via a serving base station 108, a communication session using a first audio codec that provides a first audio bandwidth. In some examples, the communication session is a voice call 102, such as a VoNR session. If the UE 106 is acting as an originating UE, the UE 106 may send, at block 302, a session request, such as a SIP message using the SIP INVITE method, via the serving base station 108 to request establishment of the call 102 with a terminating device, such as another UE. The UE 106 may also send a SDP offer as part of this session request at block 302 to specify, among other things, particular codecs, including audio codecs, that are supported by the UE 106. The audio codecs supported by the UE 106 may be listed in order of preference, the first codec in the list being a preferred audio codec (or a default audio codec that is used by default if the terminating device also supports that audio codec, and if the RF conditions are good enough to use that audio codec). Accordingly, the first audio codec may be listed first in the list of supported audio codecs. In some implementations, the first audio codec is a first EVS audio codec, such as the EVS-WB codec 114 or the EVS-SWB codec.

At 304, the UE 106 may generate audio data 206 based on sound in an environment of the UE 106. This audio data 206 may be generated during the communication session (e.g., the voice call 102) established at block 302 and/or the sound represented by the audio data 206 may have been captured using a microphone(s) 200 of the UE 106. If a user 100 of the UE 106 is talking when the audio data 206 is generated, the audio data 206 may represent user speech. If music is playing in the background, the audio data 206 may represent music or a combination of voice and music.

At 306, the UE 106 (e.g., the audio analyzer 208) may determine based at least in part on the audio data 206 (e.g., based on an analysis of the audio data 206), whether the sound includes frequencies outside of a range of frequencies 210 associated with a human voice. In some implementations, the determination at block 306 includes determining whether music is being played in the environment of the UE 106. Furthermore, as shown by blocks 308 and 310, the determination at block 306 may utilize machine learning and/or artificial intelligence techniques.

At 308, for instance, the audio data 206 may be provided as input to a trained machine learning model(s), as described herein. At 310, the trained machine learning model(s) may generate, as output therefrom, a probability that a source of at least some of the sound is not the human voice. For example, the probability may relate to a probability that music is being played in the environment of the UE 106. In some implementations, the UE 106 may determine whether the probability generated as output from the trained machine learning model(s) meets or exceeds a threshold probability to make the determination at block 306. If the UE 106 (e.g., the audio analyzer 208) determines that the sound does not include frequencies outside of a range of frequencies 210 associated with a human voice, such as by determining that music is not being played in the environment of the UE 106, the process 300 may follow the NO route from block 306 to block 312 where the UE 106 continues the communication session (e.g., the voice call 102) using the first audio codec, and the process 300 may proceed from block 312 to block 304 to iterate the "upgrade" algorithm of FIG. 3A. If, at block 306, the UE 106 (e.g., the audio analyzer 208) determines that the sound includes frequencies outside of a range of frequencies 210 associated with a human voice, such as by determining that music is being played in the environment of the UE 106, the process 300 may follow the YES route from block 306 to block 314.

At 314, the UE 106 may switch (e.g., initiate a transition) to using a second audio codec that provides a second audio bandwidth greater than the first audio bandwidth provided by the first audio codec. As shown by sub-block 316, the switch at block 314 may involve sending a message to the serving base station 108 for transitioning from using the first audio codec to using the second audio codec that provides the greater (e.g., extended) audio bandwidth. As described herein, the message sent at sub-block 316 may include a payload header that specifies the target, second audio codec, which may be a second EVS audio codec, such as the EVS-FB codec 118. In some examples, the message sent at sub-block 316 includes a SDP offer and is sent using RTCP, such as a RTCP-APP packet. If the terminating device (e.g., the UE on the other end of the communication session) does not support the target, second audio codec, the session may continue using the "lowest common denominator" audio codec, which may be the EVS-SWB codec 114 in the example of FIGS. 1A and 1B. FIG. 3A depicts an example where both UEs support using the second audio codec (e.g., the EVS-FB codec 118).

At 318, the UE 106 may continue, via the serving base station 108, the communication session (e.g., the call 102) using the second audio codec, such as the EVS-FB codec 118. Accordingly, continuing the communication session at block 318 using the second audio codec may be based at least in part on both UEs involved in the communication session supporting the second audio codec. In this way, the user on the other end of the communication session (e.g., the call 102) can experience non-vocal frequencies, such as music frequencies 116, with higher-fidelity and higher-quality using the EVS-FB codec 118.

As shown by the off-page reference "A" in FIGS. 3A and 3B, the process 300 may continue from block 318 to block 320, which is shown in FIG. 3B. At 320, after having switched to using the second audio codec that provides greater audio bandwidth (e.g., the EVS-FB codec), the UE 106 may generate additional/second audio data 206 based on sound in an environment of the UE 106. The operation(s) performed at block 320 may be similar to the operation(s) performed at block 304, just at a subsequent time during the communication session (e.g., the call 102).

At 322, the UE 106 (e.g., the audio analyzer 208) may determine based at least in part on the additional/second audio data 206 (e.g., based on an analysis of the audio data 206), whether the sound includes frequencies outside of a range of frequencies 210 associated with a human voice. The operation(s) performed at block 322 may be similar to the operation(s) performed at block 306, including, for example, determining whether music is being played in the environment of the UE 106. Furthermore, as shown by blocks 324 and 326, the determination at block 322 may utilize machine learning and/or artificial intelligence techniques. For example, the operation(s) performed at block 324 may be similar to the operation(s) performed at block 308, and the operation(s) performed at block 326 may be similar to the operation(s) performed at block 310, just on subsequently-generated audio data 206.

If the UE 106 (e.g., the audio analyzer 208) determines that the sound includes (e.g., still includes) frequencies outside of a range of frequencies 210 associated with a human voice, such as by determining that music is being played in the environment of the UE 106, the process 300 may follow the YES route from block 322 to block 328 where the UE 106 continues the communication session (e.g., the voice call 102) using the second audio codec, and the process 300 may proceed from block 328 to block 320 to iterate the "downgrade" algorithm of FIG. 3B. If the UE 106 (e.g., the audio analyzer 208) determines that the sound no longer includes frequencies outside of a range of frequencies 210 associated with a human voice, such as by determining that music is no longer being played in the environment of the UE 106, the process 300 may follow the NO route from block 322 to block 330.

At 330, the UE 106 may switch (e.g., initiate a transition) to using the first audio codec that provides the first audio bandwidth less than the second audio bandwidth provided by the second audio codec. As shown by sub-block 332, the switch at block 330 may involve sending a second message to the serving base station 108 for transitioning from using the second audio codec to using the first audio codec that provides the lesser audio bandwidth. The operation(s) performed at sub-block 332 may be similar to the operation(s) performed at sub-block 316, except that a different target audio codec is specified to transition audio codecs in the opposite direction relative to FIG. 3A.

At 334, the UE 106 may continue, via the serving base station 108, the communication session (e.g., the call 102) using the first audio codec, such as the EVS-SWB codec 114. Continuing the communication session at block 334 using the first audio codec may be based at least in part on both UEs involved in the communication session supporting the first audio codec. In this way, resources are conserved by refraining from utilizing the music-capable, second audio codec at a time when doing so would utilize more resources than necessary, and the less-then-full-band first audio codec is sufficient for voice as the primary sound of interest.

As shown by the off-page reference "B" in FIGS. 3A and 3B, the process 300 may continue from block 334 to block 304, which is shown in FIG. 3A in order to iterate the algorithm for switching back and forth between audio codecs during the ongoing communication session.

Figure 4:
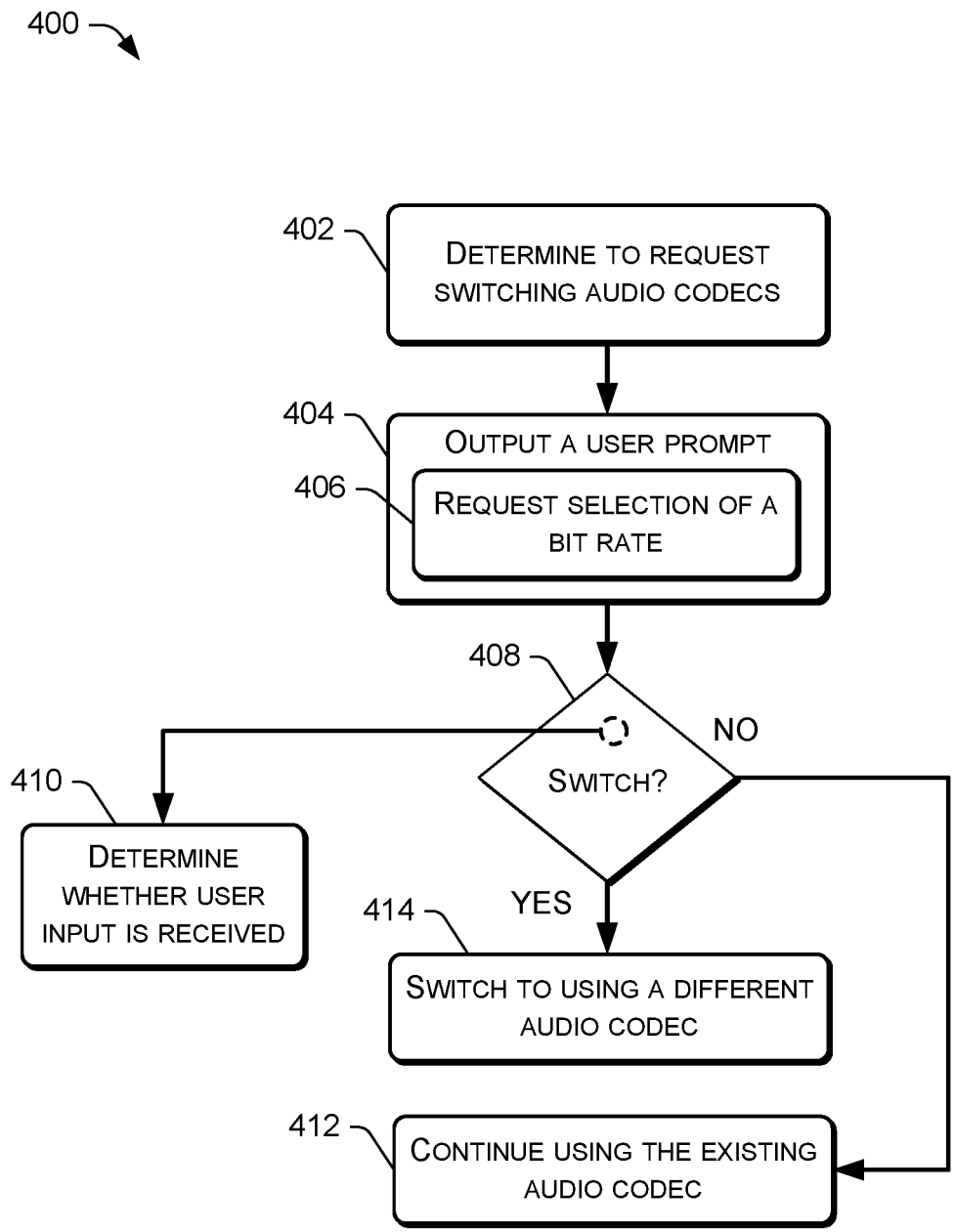
FIG. 4 illustrates a flowchart of an example process for outputting a user prompt prior to transitioning to using a different audio codec.

FIG. 4 illustrates a flowchart of an example process 400 for outputting a user prompt prior to transitioning to using a different audio codec. For discussion purposes, reference is made to the previous figures in describing the process 400.

At 402, a UE 106 may determine (e.g., based on sound detected in an environment of the UE 106) to request switching from using an existing audio codec currently being used for an ongoing communication session (e.g., a call 102) to using a different audio codec. For example, the UE 106 may detect out-of-range frequencies (e.g., music playing) in the environment of the UE 106, as described with respect to FIG. 3A, and the UE 106 may determine to request upgrading from a first audio codec to a second audio codec that provides greater audio bandwidth. Alternatively, the UE 106, at block 402, may not detect out-of-range frequencies (e.g., no music playing) in the environment of the UE 106, as described with respect to FIG. 3B, and the UE 106 may determine to request downgrading from a second audio codec to a first audio codec that provides lesser audio bandwidth.

At 404, in response to the determination at block 402, the UE 106 may output a user prompt associated with transitioning (e.g., requesting to transition) to a different audio codec. If upgrading to a greater audio bandwidth, the user prompt may be output at block 404 in response to determining that music is being played in the environment of the UE 106, for example. In this scenario, the user prompt may indicate that the UE 106 detected background music and the user prompt may request to transition from an existing audio codec to a different audio codec that provides a greater audio bandwidth, such as the EVS-FB codec (or a similar music-capable audio codec). If downgrading to a lesser audio bandwidth, the user prompt may be output at block 404 in response to determining that music is no longer being played in the environment of the UE 106, for example. In this scenario, the user prompt may indicate that the UE 106 has ceased detecting background music and the user prompt may request to transition from an existing audio codec to a different audio codec that provides a lesser audio bandwidth, such as the EVS-SWB codec or the EVS-WB codec.

At 404, the user prompt may be output via a display of the UE 106, such as a visual user prompt with text informing the user 100 as to what the user prompt is about and with selection elements presented on the display for selection by the user 100. Additionally, or alternatively, the user prompt may be an audible prompt that is output via a speaker(s) of the UE 106, and/or a vibratory prompt via a mechanical actuator, etc.

At sub-block 406, the user prompt may request a selection of a bit rate among multiple available bit rates to use with the different audio codec. For example, if upgrading to the EVS-FB codec, the user prompt may request a selection of a bit rate among multiple available bit rates within a range of 16.4 to 128 kbps. The user's selection of a particular bit rate may dictate the bit rate that is selected by the codec adapter 212.

At 408, the UE 106 may determine whether to switch to the different audio codec. As part of this determination, the UE 106 may determine whether user input is received at block 410. If, for example, no user input is received via the UE 106, the user prompt may timeout and the process 400 may follow the NO route from block 408 to block 412, where the UE 106 may continue to use the existing audio codec instead of switching to using the different audio codec. In other words, in the absence of explicit approval from the user 100 (indicated via user input) to switch to the different audio codec, the UE 106 (e.g., the codec adapter 212) may refrain from switching to a different audio codec. In other implementations, the UE 106, at block 410, receive user input to refrain from transitioning to using the different audio codec, and based on this user input, the process 400 may follow the NO route from block 412 to continue using the existing audio codec.

If, at 410, the UE 106 receives user input (e.g., via a touch screen of the UE 106, speech input, etc.) to transition to the different audio codec, the process 400 may follow the YES route from block 408 to block 414 where the UE 106 may transition to using the different audio codec. If upgrading, the user input received at block 410 may request to transition the from using a first audio codec (e.g., the EVS-SWB codec) to using a second audio codec (e.g., the EVS-FB codec). If downgrading, the user input received at block 410 may request to transition the from using the second audio codec (e.g., the EVS-FB codec) to using the first audio codec (e.g., the EVS-SWB codec). In some implementations, the UE 106 may receive, at 410, a selection of a selected bit rate among multiple available bit rates that are made available for selection via the user prompt, and the UE 106 may transition to using the different audio codec at the selected bit rate at block 414. Switching to using a different audio codec at block 414 may include sending a message to the serving base station 108 requesting to make the transition, such as the message sent at sub-block 316 or sub-block 332 of the process 300.

It is to be appreciated that the transition to using a different audio codec may occur without user intervention instead of implementing the process 400. However, the process 400 allows the user 100 of the UE 106 to have a say in whether to switch to a different audio codec or not. For instance, if the UE 106 detects music in the background and the UE 106 prompts the user 100 to switch to the EVS-FB codec 118, the user 100 may nevertheless decide that the music would not be of interest to the other user on the call 102, and the user 100 may ignore the user prompt in this situation, or the user 100 may provide user input to explicitly refrain from transitioning to the different audio codec. In the opposite direction, the UE 106 may recommend switching to the EVS-SWB codec 114, but the user 100 may wish to continue using the EVS-FB codec 118 if the user 100 would like the other user to hear background music in high-fidelity despite other advantages in using a less-than-full-band EVS audio codec.

Figure 5A:
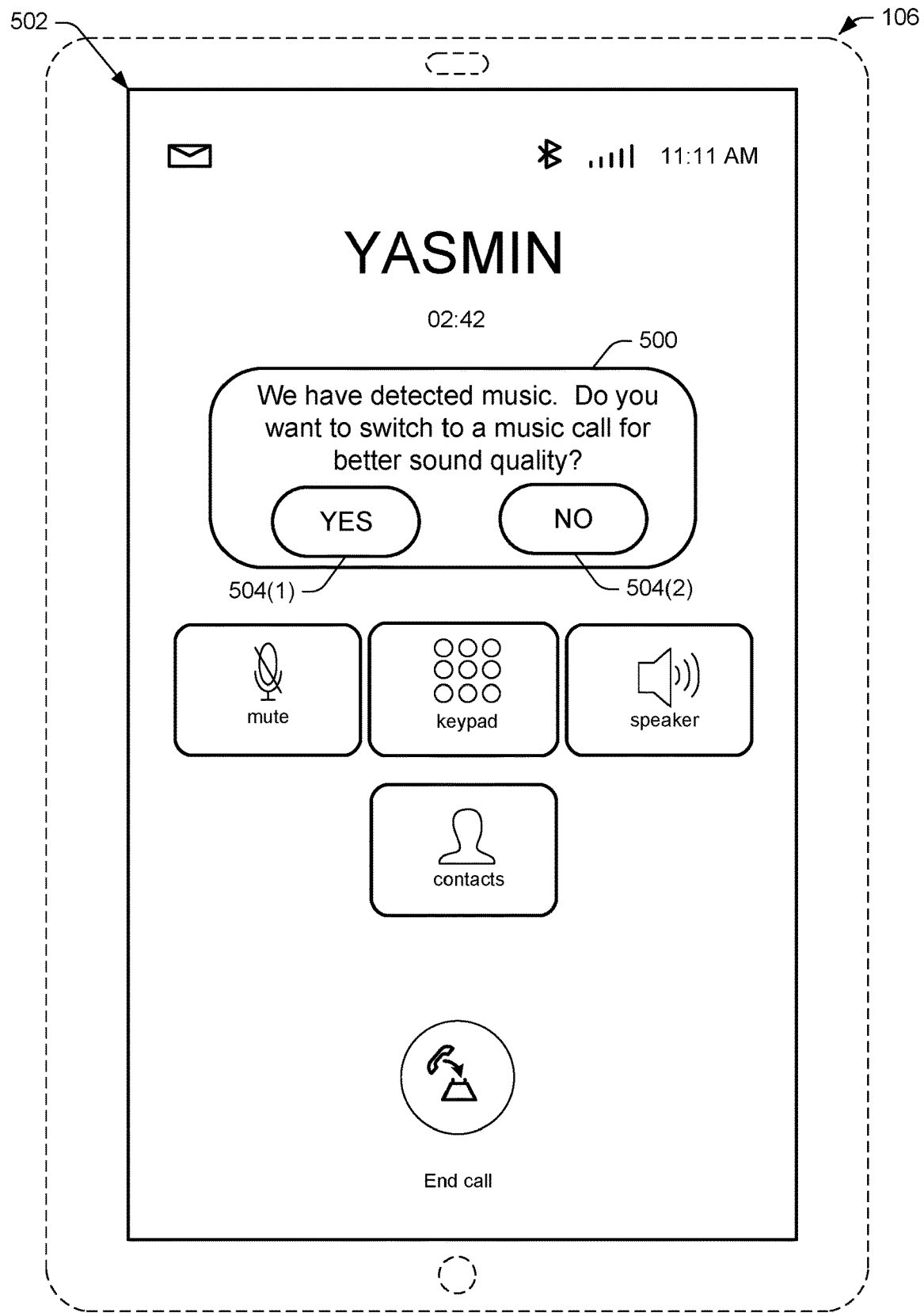
FIG. 5A illustrates an example user prompt that may be output on a display of a UE to request transitioning to a different audio codec.

FIG. 5A illustrates an example user prompt 500 that may be output on a display 502 of a UE 106 to request transitioning to a different audio codec. In the example of FIG. 5A, a user 100 of the UE 106 has called another user named Yasmin. The call 102 may have been established using a first audio codec that provides a first audio bandwidth (e.g., the EVS-SWB codec 114), as described herein. During the call 102, the UE 106 may generate audio data 206 based on sound in an environment of the UE 106, and the UE 106 (e.g., the audio analyzer 208) may determine, based at least in part on an analysis of the audio data 206, that music is being played in the environment of the UE 106. Accordingly, the UE 106 may determine to request switching to a second audio codec (e.g., the EVS-FB codec 118) based on this sound detection.

In response to determining that the music is being played in the environment, the UE 106 may output (e.g., via the display 502) the user prompt 500. The user prompt 500 may indicate that the UE 106 detected background music, and the user prompt 500 may ask permission or request to transition from using the first audio codec to using a second audio codec (e.g., the EVS-FB codec 118) that provides a second audio bandwidth greater than the first audio bandwidth. For example, the user prompt 500 may ask the user 100 if the user 100 would like to switch to a music call for better sound quality. Furthermore, the user prompt 500 may output selection elements 504 (e.g., soft buttons) on the display 502, such as a "YES" element 504(1) and a "NO" element 504(2). The user 100 may provide user input by selecting one of the selection elements 504. If the UE 106 receives user input (e.g., via the display 502, which may be a touchscreen) selecting the "YES" element 504(1) to transition from using the first audio codec to using the second audio codec, the UE 106 may send a message to the serving base station 108 for transitioning to the second audio codec, and the UE 106 may continue the call 102 using the second audio codec. If the UE 106 receives user input selecting the "NO" element 504(2) to refrain from transitioning, or if no user input is received and the user prompt 500 times out (e.g., after a number of seconds), the UE 106 may continue the call 102 using the first audio codec.

Figure 5B:
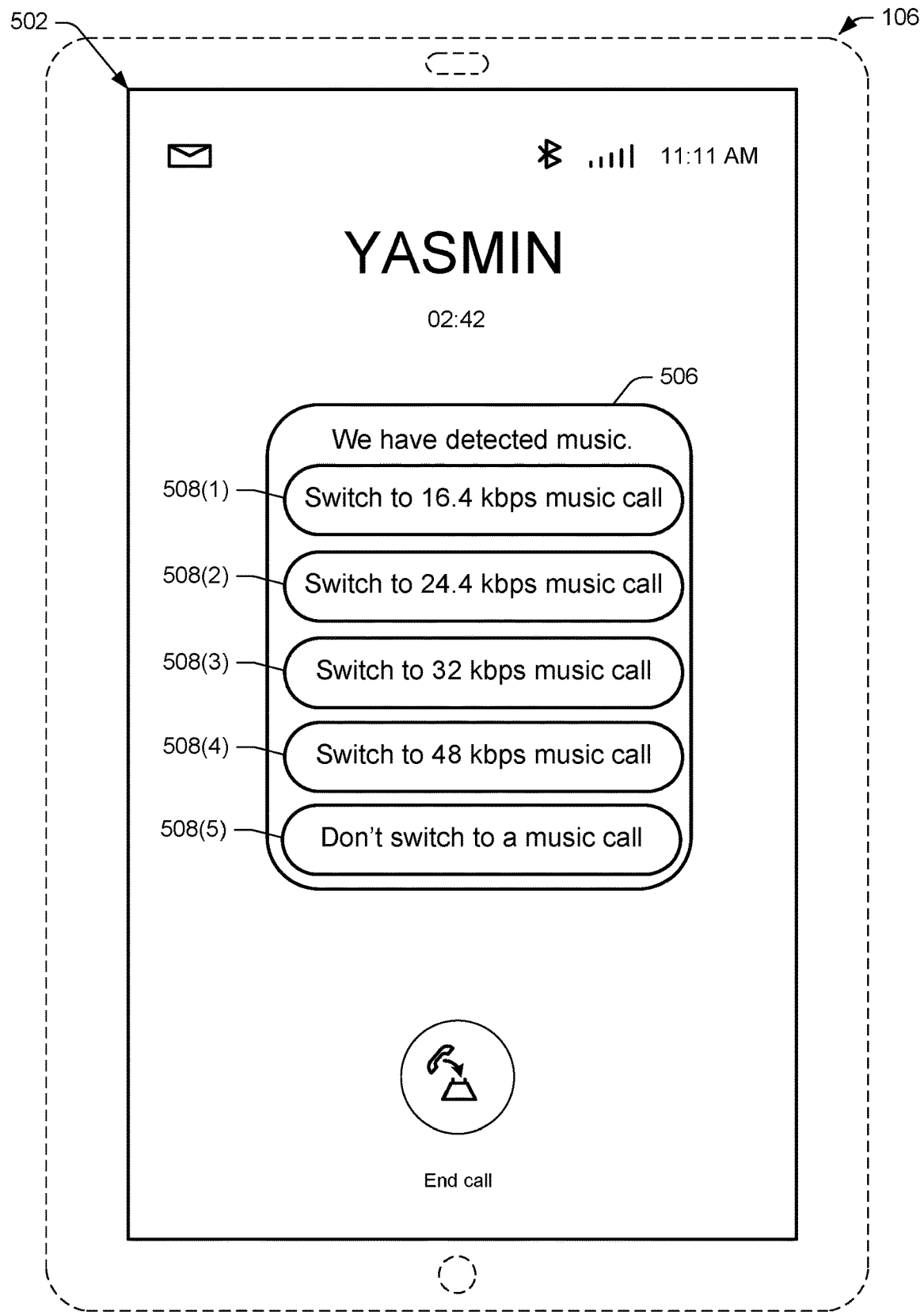
FIG. 5B illustrates another example user prompt that may be output on a display of a UE to request transitioning to a different audio codec.

FIG. 5B illustrates another example user prompt 506 that may be output on a display 502 of a UE 106 to request transitioning to a different audio codec. In the example of FIG. 5B, a user 100 of the UE 106 has called another user named Yasmin. The call 102 may have been established using a first audio codec that provides a first audio bandwidth (e.g., the EVS-SWB codec 114), as described herein. During the call 102, the UE 106 may generate audio data 206 based on sound in an environment of the UE 106, and the UE 106 (e.g., the audio analyzer 208) may determine, based at least in part on an analysis of the audio data 206, that music is being played in the environment of the UE 106. Accordingly, the UE 106 may determine to request switching to a second audio codec (e.g., the EVS-FB codec 118) based on this sound detection.

In response to determining that the music is being played in the environment, the UE 106 may output (e.g., via the display 502) the user prompt 506. The user prompt 506 may indicate that the UE 106 detected background music, and the user prompt 500 may ask permission or request to transition from using the first audio codec to using a second audio codec (e.g., the EVS-FB codec 118) that provides a second audio bandwidth greater than the first audio bandwidth. For example, the user prompt 506 may ask the user 100 if the user 100 would like to switch to a music call at various bit rates for better sound quality. In the example of FIG. 5B, the user prompt 506 may output selection elements 508 (e.g., soft buttons) on the display 502. These selection elements 508 may request selection of a bit rate among multiple available bit rates to use with the second audio codec. For example, a first selection element 508(1) is for switching to the second audio codec (e.g., the EVS-FB codec 118) at 16.4 kbps, a second selection element 508(2) is for switching to the second audio codec at 24.4 kbps, a third selection element 508(3) is for switching to the second audio codec at 32 kbps, and a fourth selection element 508(4) is for switching to the second audio codec at 48 kbps. Of course more selection elements 508 may be output to offer additional bit rates (e.g., 64 kbps, 96 kbps, 128 kbps, etc.), other selection elements 508 may be output instead of those shown in FIG. 5B, or fewer selection elements 508 may be output, such as two selection elements 508 for two different bit rates. A fifth selection element 508(5), upon selection, may cause the UE 106 to refrain from switching to the second audio codec.

The user 100 may provide user input by selecting one of the selection elements 508. If the UE 106 receives user input (e.g., via the display 502) selecting the selection element 508(2) as a selected bit rate (or as a selected element), the UE 106 may send a message to the serving base station 108 for transitioning to the second audio codec at the selected bit rate of 24.4 kbps, and the UE 106 may continue the call 102 using the second audio codec at the selected bit rate of 24.4 kbps. If the UE 106 receives user input selecting the selection element 504(5) to refrain from transitioning, or if no user input is received and the user prompt 506 times out (e.g., after a number of seconds), the UE 106 may continue the call 102 using the first audio codec.

Figure 5C:
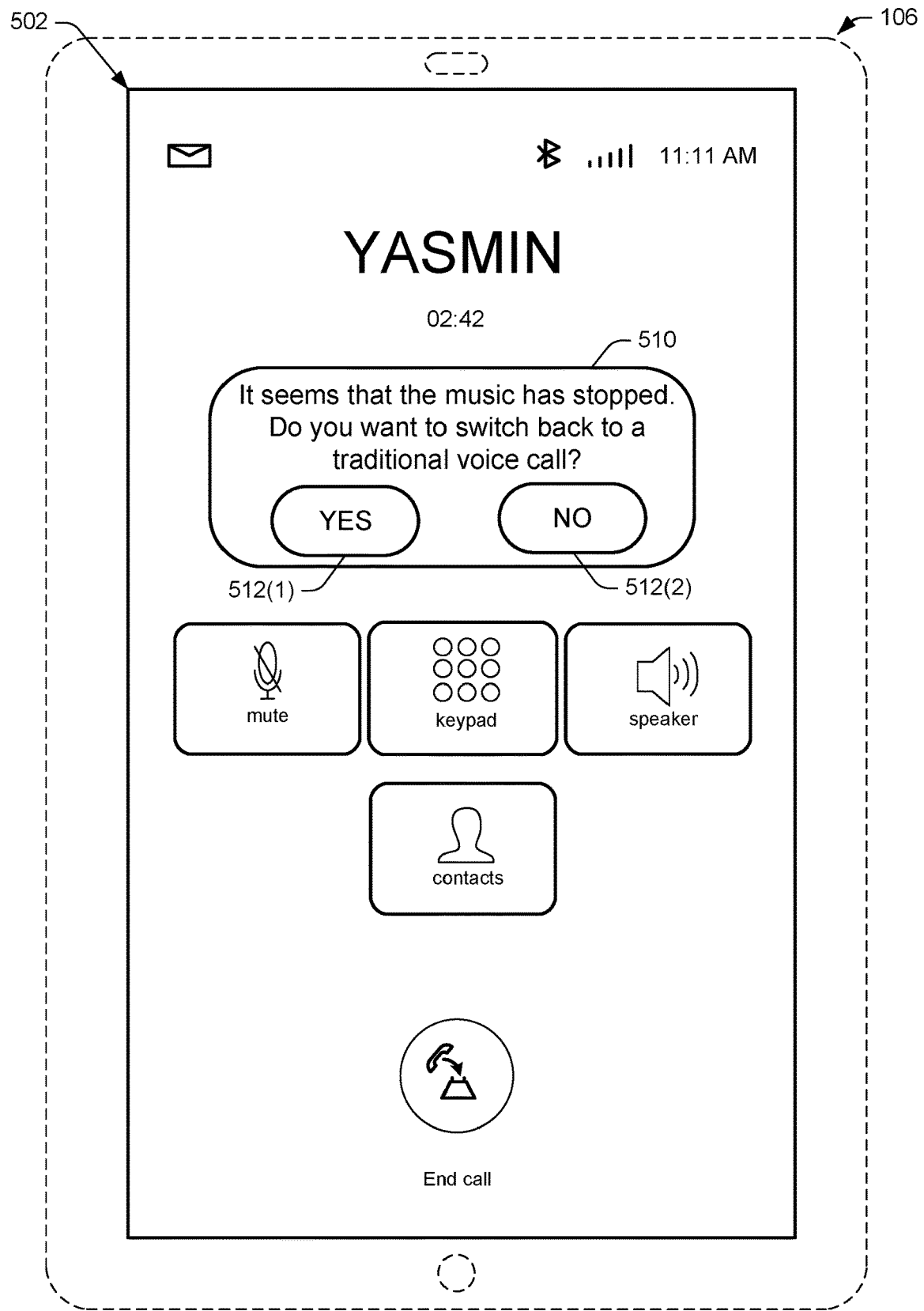
FIG. 5C illustrates another example user prompt that may be output on a display of a UE to request transitioning to a different audio codec.

FIG. 5C illustrates another example user prompt 510 that may be output on a display 502 of a UE 106 to request transitioning to a different audio codec. In the example of FIG. 5C, a user 100 of the UE 106 has called another user named Yasmin. The call 102 may have been established using a first audio codec that provides a first audio bandwidth (e.g., the EVS-SWB codec 114) and subsequently transitioned to using a second audio codec that provides a second, greater audio bandwidth (e.g., the EVS-FB codec 118), as described herein. During the call 102, and while the UE 106 is using the second audio codec, the UE 106 may generate audio data 206 based on sound in an environment of the UE 106, and the UE 106 (e.g., the audio analyzer 208) may determine, based at least in part on an analysis of the audio data 206, that music is no longer being played in the environment of the UE 106. Accordingly, the UE 106 may determine to request switching back to the first audio codec (e.g., the EVS-SWB codec 114) based on this sound detection.

In response to determining that the music is no longer being played in the environment, the UE 106 may output (e.g., via the display 502) the user prompt 510. The user prompt 510 may indicate that the UE 106 has ceased detecting background music, and the user prompt 510 may ask permission or request to transition from using the second audio codec (e.g., the EVS-FB codec 118) to using the first audio codec (e.g., the EVS-SWB codec 114). For example, the user prompt 510 may ask the user 100 if the user 100 would like to switch back to a traditional voice call since the music has stopped. Furthermore, the user prompt 510 may output selection elements 512 (e.g., soft buttons) on the display 502, such as a "YES" element 512(1) and a "NO" element 512(2). The user 100 may provide user input by selecting one of the selection elements 512. If the UE 106 receives user input (e.g., via the display 502) selecting the "YES" element 512(1) to transition from using the second audio codec to using the first audio codec, the UE 106 may send a message to the serving base station 108 for transitioning to the first audio codec, and the UE 106 may continue the call 102 using the first audio codec. If the UE 106 receives user input selecting the "NO" element 512(2) to refrain from transitioning, or if no user input is received and the user prompt 510 times out (e.g., after a number of seconds), the UE 106 may continue the call 102 using the second audio codec.

Figure 6:
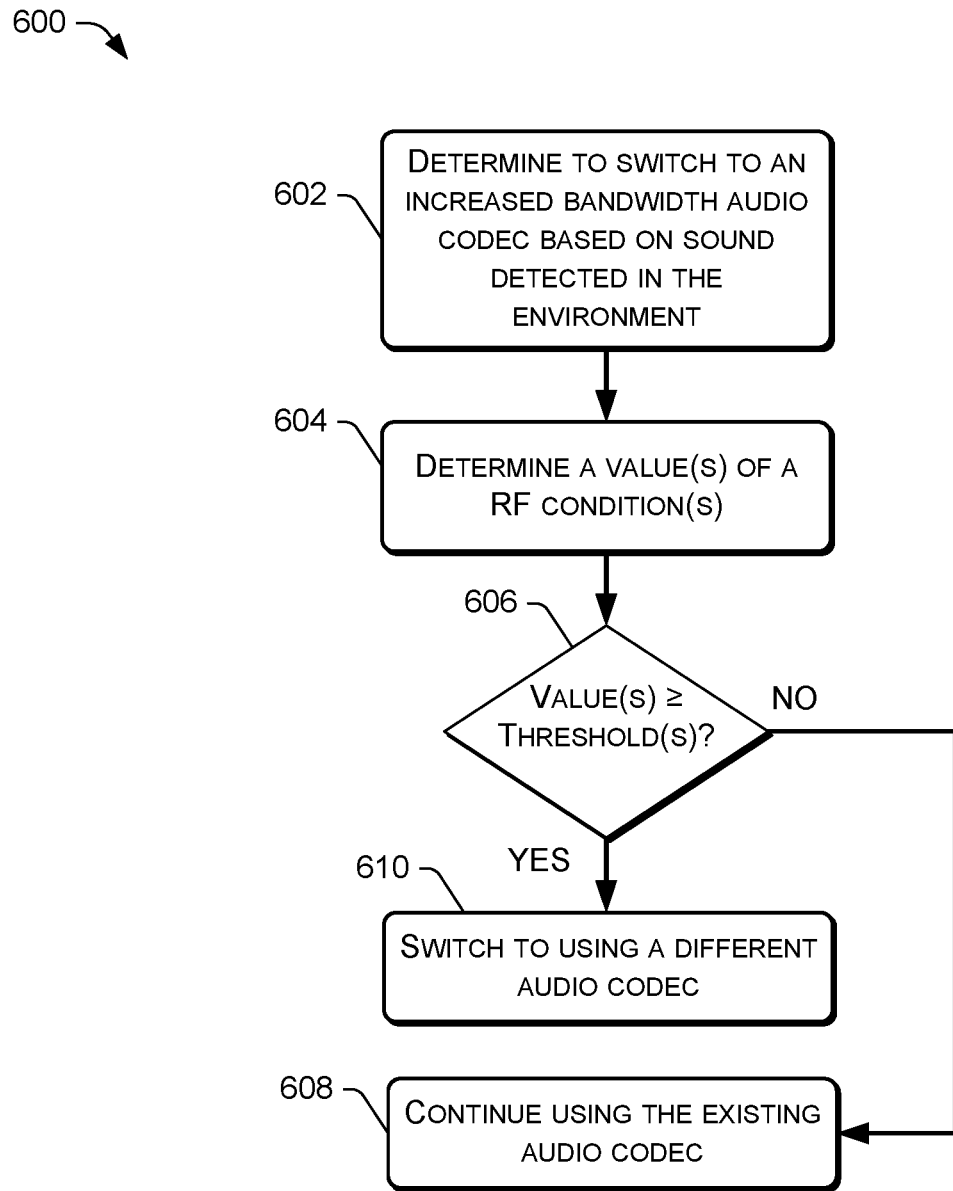
FIG. 6 illustrates a flowchart of an example process for adaptively transitioning to a different audio codec based at least in part on a RF condition.

FIG. 6 illustrates a flowchart of an example process 600 for adaptively transitioning between audio codecs based at least in part on a RF condition. For discussion purposes, reference is made to the previous figures in describing the process 600.

At 602, a UE 106 may determine, based on sound detected in an environment of the UE 106, to switch from using an existing audio codec currently being used for an ongoing communication session (e.g., a call 102) to using a different audio codec. For example, the UE 106 may detect out-of-range frequencies (e.g., music playing) in the environment of the UE 106, as described with respect to FIG. 3A, and the UE 106 may determine to upgrade from a first audio codec to a second audio codec that provides greater audio bandwidth.

At 604, in response to the determination at block 602, the UE 106 may determine (e.g., measure) a value(s) of a RF condition(s) associated with a serving base station 108. In some implementations, the value(s) may include, without limitation, a RSSI value, a RSRP value, and/or a RSRQ value.

At 606, the UE 106 may determine whether the value(s) indicative of the RF condition(s) is/are equal to or greater than a threshold value(s). For example, the UE 106 may determine whether a RSSI value is equal to or greater than a RSSI threshold value, and/or whether a RSRP value is equal to or greater than a RSRP value, and/or whether a RSRQ value is equal to or greater than a RSRQ value. If, at 606, the UE 106 determines that the value(s) is/are not equal to or greater than the threshold value(s), the process 600 may follow the NO route from block 606 to continue using the existing audio codec at block 608. This is because, in poor (e.g., below-threshold) RF conditions, voice quality of a call 102 may be improved by using a less-than-full-band EVS audio codec, as opposed to switching to using a music-capable audio codec, such as the EVS-FB codec 118. In other words, before switching to the EVS-FB codec 118, for example, the UE 106 may check to make sure that the RF conditions are good enough to sustain a minimal quality voice call using the EVS-FB codec 118. If the RF conditions are not good enough, the UE 106 may not switch to using the EVS-FB codec 118 notwithstanding a detection of music in the environment of the UE 106.

If, at 606, the UE 106 determines that the value(s) is/are equal to or greater than the threshold value(s), the process 600 may follow the YES route from block 606 to block 610 where the UE 106 may transition to using the second audio codec (e.g., the EVS-FB codec). Switching to using the second audio codec at block 610 may include sending a message to the serving base station 108 requesting to make the transition, such as the message sent at sub-block 316 of the process 300.

It is to be appreciated that additional or alternative factors besides the RF condition(s) may be taken into account in determining whether to transition to the second audio codec (e.g., the EVS-FB codec) or not. Such additional or alternative factors may include, without limitation, a location of the UE 106, a type communication session(s) that is ongoing on the UE 106 (e.g., media playback, voice call 102, etc.), and/or whether carrier aggregation (e.g., New Radio Carrier Aggregation (NRCA) is being utilized for the communication session the UE 106 is involved in, among other possible factors.

Figure 7:
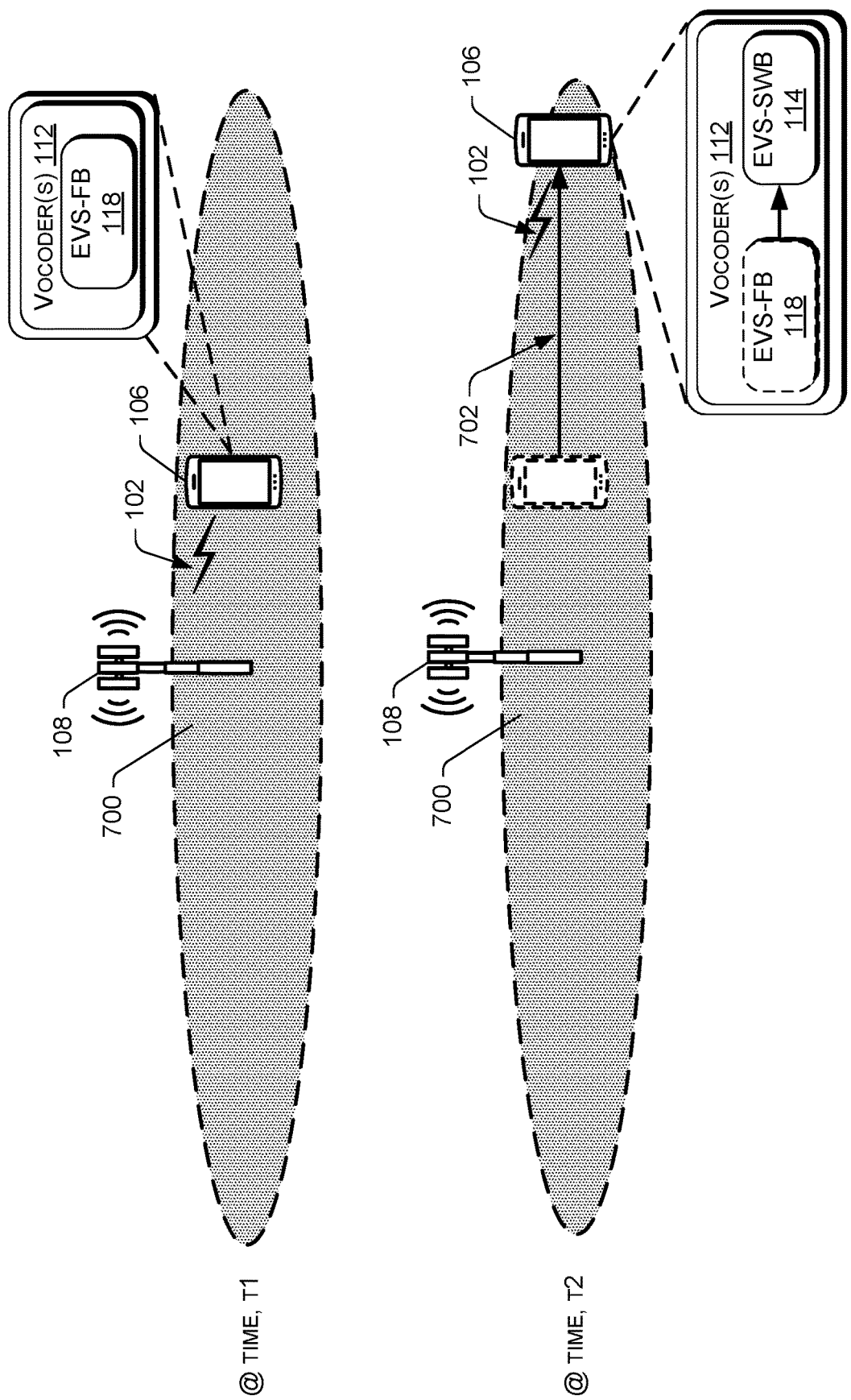
FIG. 7 is an example diagram illustrating a technique for providing an optimal voice experience over varying RF conditions while using EVS audio codecs, in accordance with various embodiments.

FIG. 7 is an example diagram illustrating a technique for providing an optimal voice experience over varying RF conditions while using EVS audio codecs, in accordance with various embodiments. In order to provide an optimal voice experience over varying RF conditions, the UE 106 (e.g., the vocoder(s) 112) depicted in FIG. 7 may be configured to adaptively (e.g., during a communication session, such as a call 102) switch between using the EVS-FB codec 118 as a default audio codec and a less-than-full band EVS audio codec that provides decreased audio bandwidth, such as the EVS-SWB codec 114. For instance, at time, T1, the UE 106 may establish a communication session (e.g., a call 102) using the EVS-FB codec 118 by default for a better music experience in good (e.g., above-threshold) RF conditions. As shown in FIG. 7, the UE 106, at time, T1, may be relatively close to a center of a cell 700 associated with the serving base station 108. When the UE 106 is at the location relative to the base station 108 shown at time, T1, in FIG. 7, values indicative of various RF conditions, such as a RSSI value, a RSRP value, and/or a RSRQ value, may be equal to or greater than a threshold value(s), indicating that RF conditions are good enough, or that the RF conditions are sufficient for providing good voice quality (e.g., at or above a minimal level of voice quality) to use the EVS-FB codec 118 as the audio codec for the communication session (e.g., the call 102).

At time, T2, the UE 106 may move 702 to a new location close to the edge of the cell 700. At some point during the movement 702 of the UE 106, the UE 106 may determine (e.g., detect, measure, etc.) a RF condition(s) (e.g., a RSSI value, a RSRP value, and/or a RSRQ value, etc.) and determine that the value(s) indicative of the RF condition(s) has decreased below a threshold value. Based at least in part on determining that the value(s) indicative of the RF condition(s) is less than the threshold value(s), the UE 106 (e.g., the vocoder(s) 112) may transition from using the EVS-FB codec 118 to using a less-than-full-band EVS audio codec, such as the EVS-SWB codec 114 with CAM. Using the EVS-SWB codec 114 with CAM may improve the voice quality of the call 102 in poor (e.g., below-threshold) RF conditions, such as when the user 100 carries the UE 106 to the edge of a cell's 700 coverage area. This improvement provided by the less-than-full-band EVS audio codec is due, at least in part, to the link budget gain provided by the less-than-full-band EVS audio codec (e.g., EVS-SWB, EVS-WB, etc.), which may utilize CAM to provide a link budget gain, meaning that the call 102 can be "carried" a little bit farther from the base station by using the less-than-full band EVS audio codec without a degradation in voice quality below a minimal level. If the call 102 were to continue using the EVS-FB codec 118 at time, T2, packets may be dropped or corrupted because EVS-FB does not utilize an audio packet redundancy mechanism through audio frame replication. It is to be appreciated that, if and when the RF condition(s) improves, the UE 106 (e.g., the vocoder(s) 112) can switch back to using the EVS-FB codec 118 for a better music experience in better RF conditions.

Figure 8A:
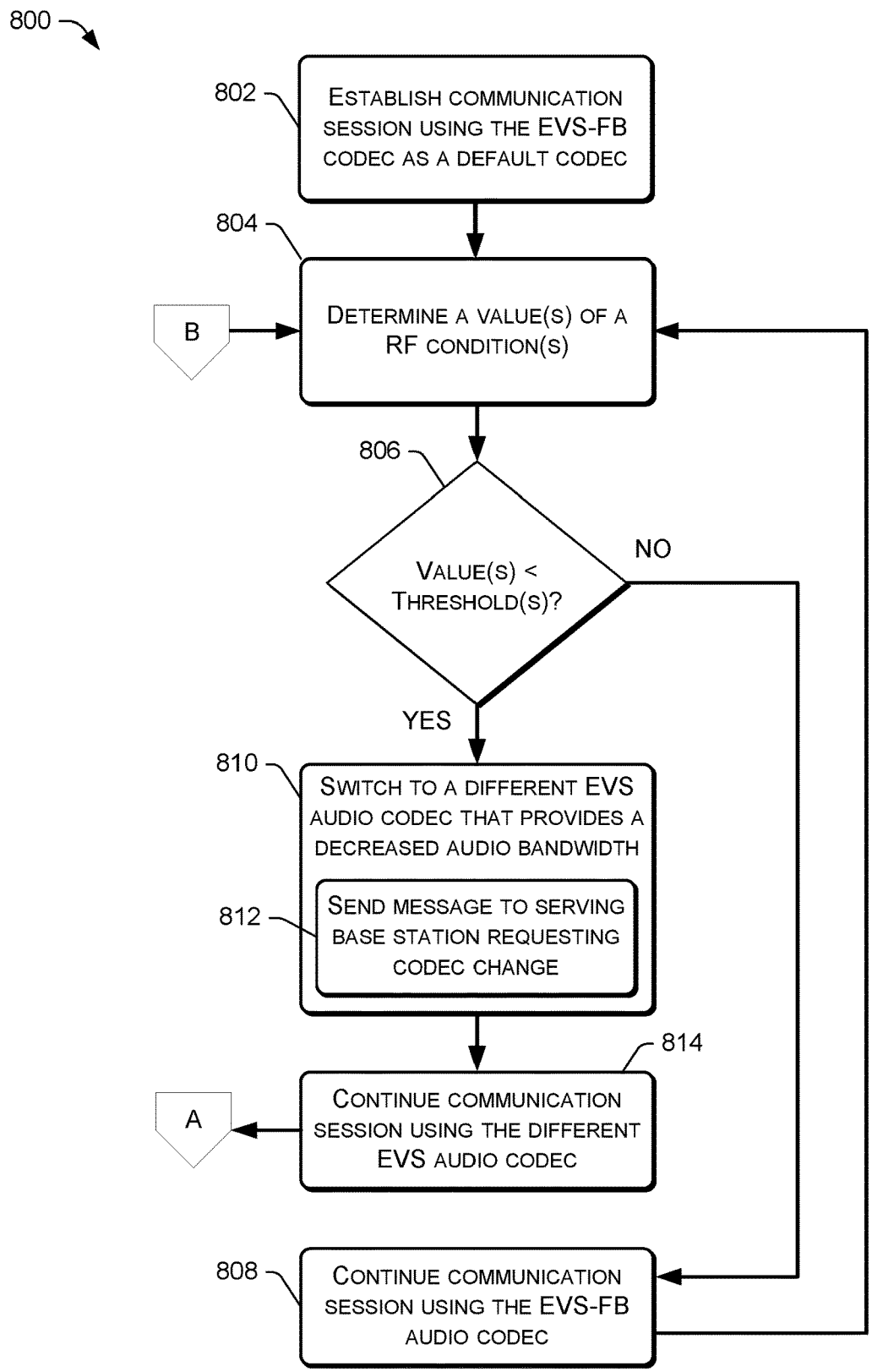
FIGS. 8A and 8B illustrate a flowchart of an example process for adaptively transitioning between audio codecs used by the UE during an ongoing communication session, in accordance with various embodiments.
Figure 8B:
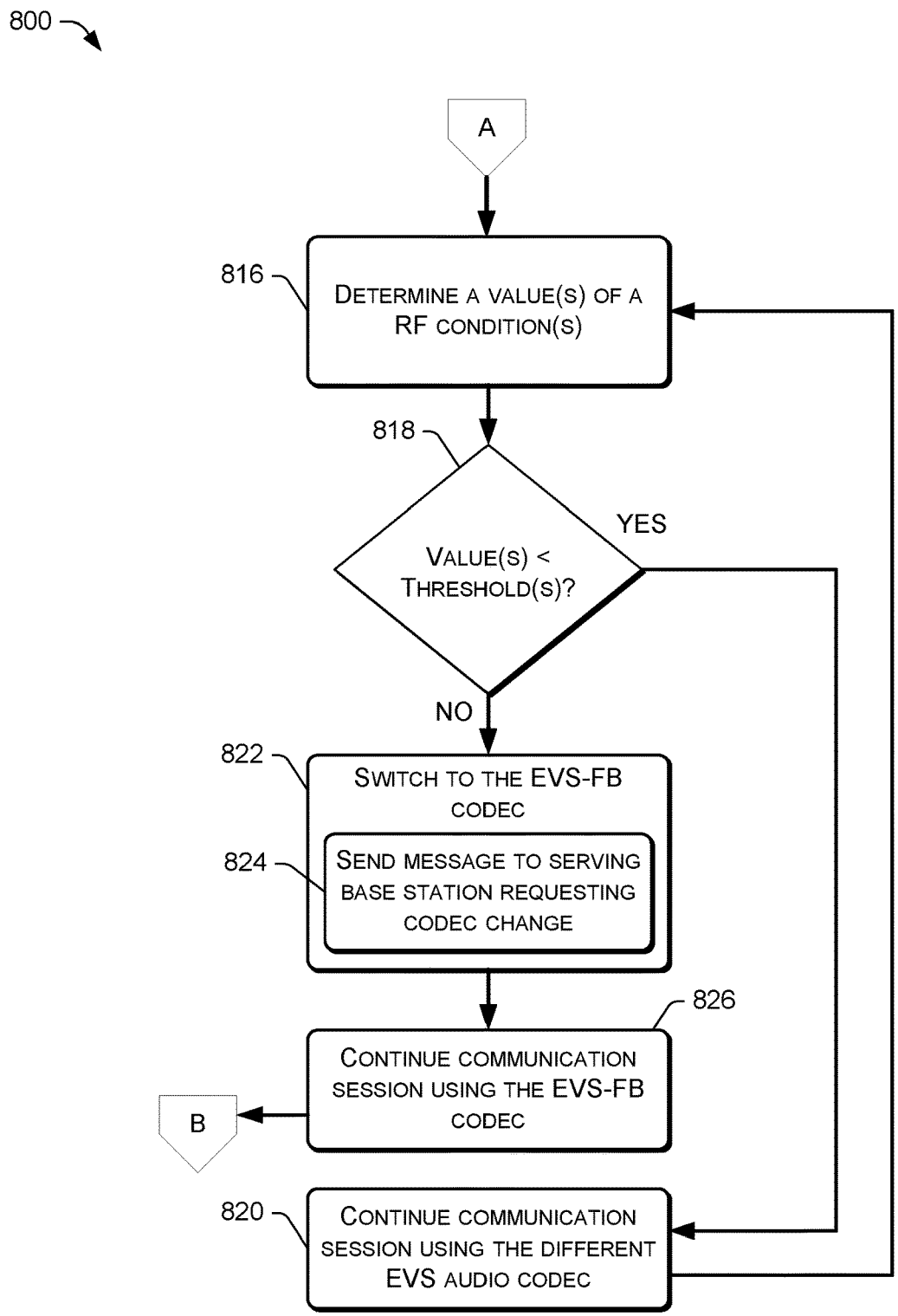

FIGS. 8A and 8B illustrate a flowchart of an example process 800 for adaptively transitioning between audio codecs used by the UE 106 during an ongoing communication session, in accordance with various embodiments. FIG. 8A illustrates downgrading to lesser audio bandwidth, and FIG. 8B illustrates upgrading to greater audio bandwidth. For discussion purposes, reference is made to the previous figure(s) in describing the process 800.

At 802, a UE 106 may establish, via a serving base station 108, a communication session using the EVS-FB codec 118 as a default codec, the EVS-FB codec 118 providing a first audio bandwidth. In some examples, the communication session is a voice call 102, such as a VoNR session. If the UE 106 is acting as an originating UE, the UE 106 may send, at block 802, a session request, such as a SIP message using the SIP INVITE method, via the serving base station 108 to request establishment of the call 102 with a terminating device, such as another UE. The UE 106 may also send a SDP offer as part of this session request at block 802 to specify, among other things, particular codecs, including audio codecs, that are supported by the UE 106. The audio codecs supported by the UE 106 may be listed in order of preference, the first codec in the list being a preferred audio codec (or a default audio codec that is used by default if the terminating device also supports that audio codec, and if the RF conditions are good enough to use that audio codec). Accordingly, the EVS-FB codec 118 may be listed first in the list of supported audio codecs at block 802. This is to provide a high-quality sound experience, such as to convey high-fidelity sound of non-vocal frequencies (e.g., music) to the user on the other end of the call 102.

At 804, the UE 106 may determine, during the communication session, a value(s) indicative of a RF condition associated with the serving base station 108. The value(s) determined at block 804 may include, without limitation, a RSSI value, a RSRP value, a RSRQ value, a signal-to-interference-plus-noise ratio (SINR) value, a bit rate value, a sample rate value, etc. The value(s) may be determined (e.g., measured) by the UE 106 at block 804, and/or the value(s) may be received from the serving base station 108 at block 804, if, say, the value(s) was/were measured on the network side of the radio link.

At 806, the UE 106 may determine whether the value(s) determined at block 804 is/are less than a threshold value(s). In some implementations, the UE 106 may maintain threshold values in local memory to compare the determined value(s) against.

If the UE 106 determines that the value(s) determined at block 804 is/are not less than the threshold value(s) (indicating good RF conditions), the process 800 may follow the NO route from block 806 to block 808 where the UE 106 continues the communication session (e.g., the voice call 102) using the EVS-FB codec 118, and the process 800 may proceed from block 808 to block 804 to iterate the "downgrade" algorithm of FIG. 3A. If, at block 806, the UE 106 determines that the value(s) determined at block 804 is/are less than the threshold value(s) (indicating poor RF conditions), the process 800 may follow the YES route from block 806 to block 810.

At 810, the UE 106 may switch (e.g., initiate a transition) to using a different EVS audio codec that provides a second audio bandwidth less than the first audio bandwidth provided by the EVS-FB codec 118. As shown by sub-block 812, the switch at block 810 may involve sending a message to the serving base station 108 for transitioning from using the EVS-FB codec 118 to using the different EVS audio codec that provides the lesser audio bandwidth. As described herein, the message sent at sub-block 812 may include a payload header that specifies the target, different audio codec, which may be a less-than-full-band EVS audio codec, such as the EVS-SWB codec 114. In some examples, the message sent at sub-block 812 includes a SDP offer and is sent using RTCP, such as a RTCP-APP packet.

At 814, the UE 106 may continue, via the serving base station 108, the communication session (e.g., the call 102) using the different EVS audio codec, such as the EVS-SWB codec 114. In some implementations, the different EVS audio codec is the EVS-SWB codec 114 with CAM, and/or the EVS-SWB codec 114 used at a bit rate of about 13.2 kbps. Accordingly, continuing the communication session at block 814 using the different, less-than-full-band EVS audio codec may allow the call 102 to sustain at least a minimal level of voice quality in degraded RF conditions. This is due, in part, to the fact that the EVS-SWB codec 114 with CAM, for example, provides partial audio packet redundancy through audio frame replication, which provides extra protection to audio payloads, which, in turn, provides better audio quality for voice in poor RF conditions, as compared to using the EVS-FB codec 118 in the same, or similar, RF conditions.

As shown by the off-page reference "A" in FIGS. 8A and 8B, the process 800 may continue from block 814 to block 816, which is shown in FIG. 8B. At 816, after having switched to using the different, less-than-full-band EVS audio codec that provides lesser audio bandwidth, the UE 106 may determine, during the communication session, another value(s) indicative of a RF condition associated with the serving base station 108. The operation(s) performed at block 816 may be similar to the operation(s) performed at block 804, just at a subsequent time during the communication session (e.g., the call 102).

At 818, the UE 106 may determine whether the value(s) determined at block 816 is/are less than a threshold value(s). The operation(s) performed at block 818 may be similar to the operation(s) performed at block 806. If the UE 106 determines that the value(s) determined at block 816 is/are less than the threshold value(s) (indicating poor RF conditions), the process 800 may follow the YES route from block 818 to block 820 where the UE 106 continues the communication session (e.g., the voice call 102) using the different EVS audio codec, such as the EVS-SWB codec 114, and the process 800 may proceed from block 820 to block 816 to iterate the "upgrade" algorithm of FIG. 8B. If, at block 818, the UE 106 determines that the value(s) determined at block 816 is/are not less than the threshold value(s) (indicating good/improved RF conditions), the process 800 may follow the NO route from block 818 to block 822.

At 822, the UE 106 may switch (e.g., initiate a transition) to using the EVS-FB codec 118 that provides the first audio bandwidth greater than the second audio bandwidth provided by the different EVS audio codec. As shown by sub-block 824, the switch at block 822 may involve sending a second message to the serving base station 108 for transitioning from using the different EVS audio codec to using the EVS-FB codec 118 that provides the greater audio bandwidth. The operation(s) performed at sub-block 824 may be similar to the operation(s) performed at sub-block 812, except that a different target audio codec is specified to transition audio codecs in the opposite direction relative to FIG. 8A.

At 826, the UE 106 may continue, via the serving base station 108, the communication session (e.g., the call 102) using the EVS-FB codec 118 to provide an enhanced music experience in above-threshold RF conditions. Continuing the communication session at block 826 using the EVS-FB codec 118 may be based at least in part on both UEs involved in the communication session supporting the EVS-FB 118 codec.

As shown by the off-page reference "B" in FIGS. 8A and 8B, the process 800 may continue from block 826 to block 804, which is shown in FIG. 8A in order to iterate the algorithm for switching back and forth between audio codecs during the ongoing communication session.

Figure 9:
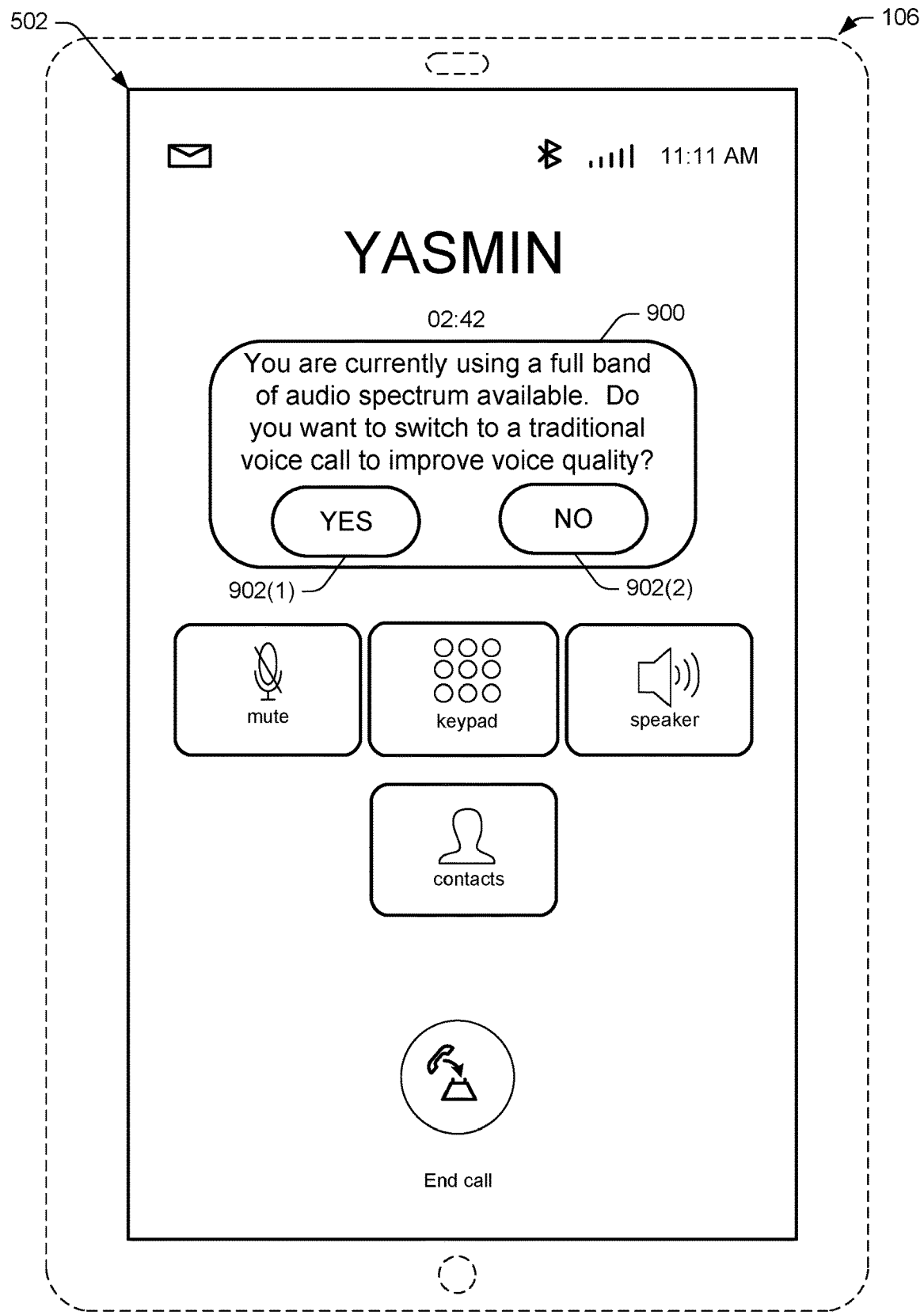
FIG. 9 illustrates an example user prompt that may be output on a display of a UE to request transitioning to a different audio codec.

FIG. 9 illustrates an example user prompt 900 that may be output on a display 502 of a UE 106 to request transitioning to a different audio codec. In the example of FIG. 9, a user 100 of the UE 106 has called another user named Yasmin. The call 102 may have been established using the EVS-FB codec 118 to provide high-quality audio for music and mixed audio content, as described herein. During the call 102, the UE 106 may determine that a value(s) indicative of a RF condition(s) associated with a serving base station 108 is less than a threshold value(s). Accordingly, the UE 106 may determine to request switching to a different EVS audio codec (e.g., the EVS-SWB codec 114) based on this degraded RF condition(s).

In response to determining that the value(s) indicative of the RF condition(s) is less than the threshold value, the UE 106 may output (e.g., via the display 502) the user prompt 900. The user prompt 900 may indicate that the UE 106 is currently using a full band of audio spectrum available and/or that it has detected poor coverage or reception, and the user prompt 900 may ask permission or request to transition from using the EVS-FB codec 118 to using a different EVS audio codec (e.g., the EVS-SWB codec 114) that provides a decreased audio bandwidth, but that is likely to improve the voice quality of the call 102. For example, the user prompt 900 may ask the user 100 if the user 100 would like to switch to a traditional voice call to improve the voice quality. Furthermore, the user prompt 900 may output selection elements 902 (e.g., soft buttons) on the display 502, such as a "YES" element 902(1) and a "NO" element 902(2). The user 100 may provide user input by selecting one of the selection elements 902. If the UE 106 receives user input (e.g., via the display 502) selecting the "YES" element 902(1) to transition from using the EVS-FB codec 118 to using the different EVS audio codec, the UE 106 may send a message to the serving base station 108 for transitioning to the different EVS audio codec, and the UE 106 may continue the call 102 using the different EVS audio codec (e.g., the EVS-SWB codec 114 with CAM). If the UE 106 receives user input selecting the "NO" element 902(2) to refrain from transitioning, or if no user input is received and the user prompt 900 times out (e.g., after a number of seconds), the UE 106 may continue the call 102 using the EVS-audio codec 118. It is to be appreciated that the process 400 may be utilized for outputting the user prompt 900 of FIG. 9.

Figure 10:
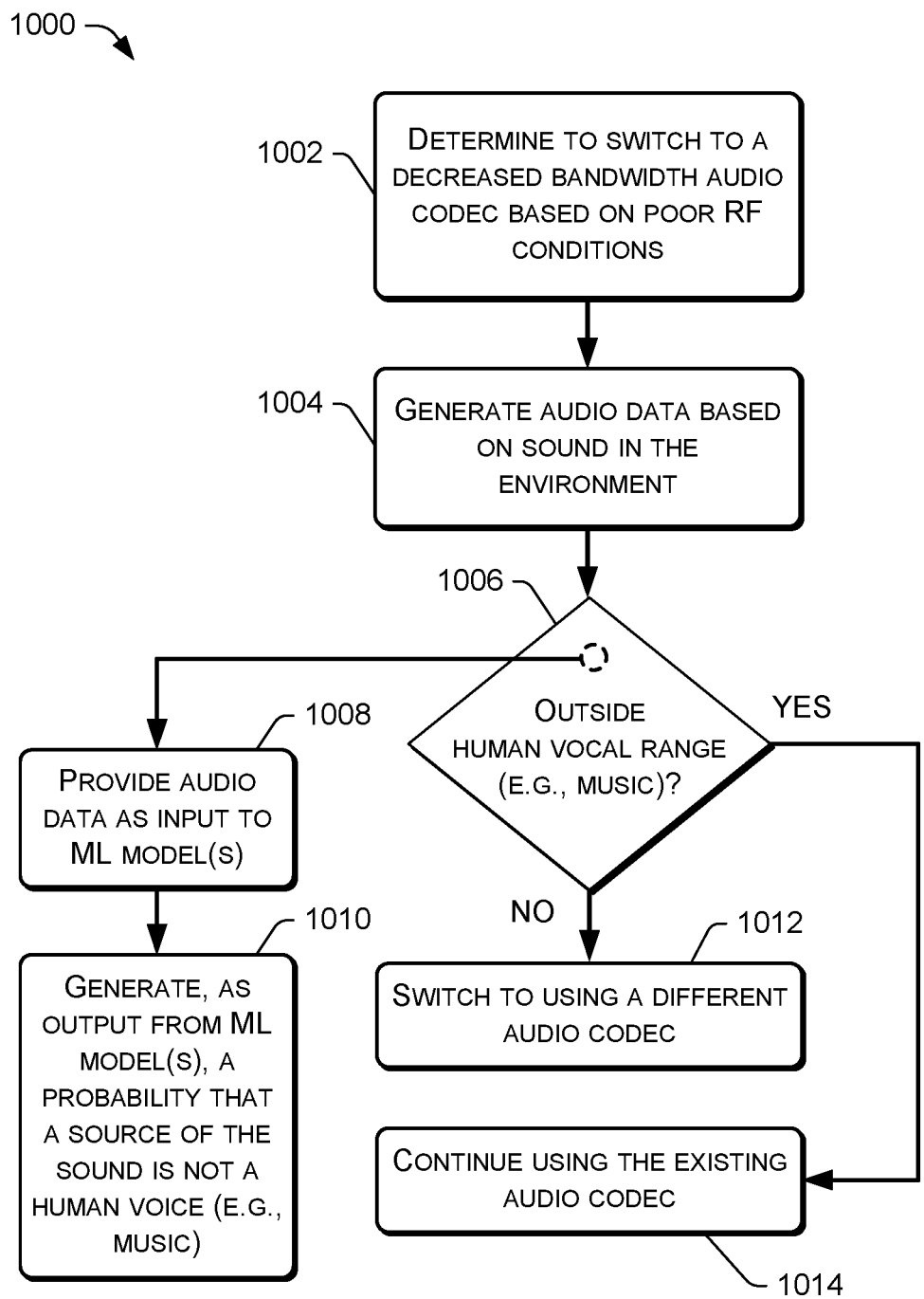
FIG. 10 illustrates a flowchart of an example process for adaptively transitioning to a different audio codec based at least in part on detecting music in the environment of the UE.

FIG. 10 illustrates a flowchart of an example process 1000 for adaptively transitioning between audio codecs based at least in part on detecting music being played in the environment of the UE 106. For discussion purposes, reference is made to the previous figures in describing the process 1000.

At 1002, a UE 106 may determine, based on a poor RF condition(s), to switch from using an existing audio codec currently being used for an ongoing communication session (e.g., a call 102) to using a different audio codec. For example, the UE 106 may determine that a value(s) indicative of a RF condition(s) is/are less than a threshold value(s), as described with respect to FIG. 8A, and the UE 106 may determine to downgrade from the existing audio codec (e.g., the EVS-FB codec 118) to a different EVS audio codec that provides lesser audio bandwidth, but greater audio redundancy and/or link budget.

At 1004, in response to the determination at block 1002, the UE 106 may generate audio data 206 based on sound in an environment of the UE 106. The operation(s) performed at block 1004 may be similar to the operation(s) performed at block 304 of the process 300.

At 1006, the UE 106 (e.g., the audio analyzer 208) may determine based at least in part on the audio data 206 (e.g., based on an analysis of the audio data 206), whether the sound includes frequencies outside of a range of frequencies 210 associated with a human voice. The operation(s) performed at block 1006 may be similar to the operation(s) performed at block 306 of the process 300, including, for example, determining whether music is being played in the environment of the UE 106. Furthermore, as shown by blocks 1008 and 1010, the determination at block 1006 may utilize machine learning and/or artificial intelligence techniques. For example, the operation(s) performed at block 1008 may be similar to the operation(s) performed at block 308 of the process 300, and the operation(s) performed at block 1010 may be similar to the operation(s) performed at block 310 of the process 300.

If, at 1006, the UE 106 (e.g., the audio analyzer 208) determines that the sound does not include frequencies outside of a range of frequencies 210 associated with a human voice, such as by determining that music is no longer being played in the environment of the UE 106, the process 1000 may follow the NO route from block 1006 to block 1012 where the UE 106 may transition to using the different EVS audio codec (e.g., the EVS-SWB codec 114). Switching to using the different EVS audio codec at block 1012 may include sending a message to the serving base station 108 requesting to make the transition, as described herein. By determining that music is not being played in the environment of the UE 106 before switching to the less-than-full-band EVS audio codec at 1012, the UE 106 can be more confident in the decision to switch to a less-than-full-band EVS audio codec knowing that the user on the other end of the call 102 is unlikely to be interested in hearing non-vocal sounds or frequencies.

If, at 1006, the UE 106 (e.g., the audio analyzer 208) determines that the sound includes frequencies outside of a range of frequencies 210 associated with a human voice, such as by determining that music is being played in the environment of the UE 106, the process 1000 may follow the YES route from block 1006 to block 1014 where the UE 106 continues the communication session (e.g., the voice call 102) using the EVS-FB codec 118.

It is to be appreciated that additional or alternative factors besides the detecting music in the environment of the UE 106 may be taken into account in determining whether to transition to the different EVS audio codec (e.g., the EVS-SWB codec 114) or not. Such additional or alternative factors may include, without limitation, a location of the UE 106, a type communication session(s) that is ongoing on the UE 106 (e.g., media playback, voice call 102, etc.), and/or whether carrier aggregation (e.g., New Radio Carrier Aggregation (NRCA) is being utilized for the communication session the UE 106 is involved in, among other possible factors.

Figure 11:
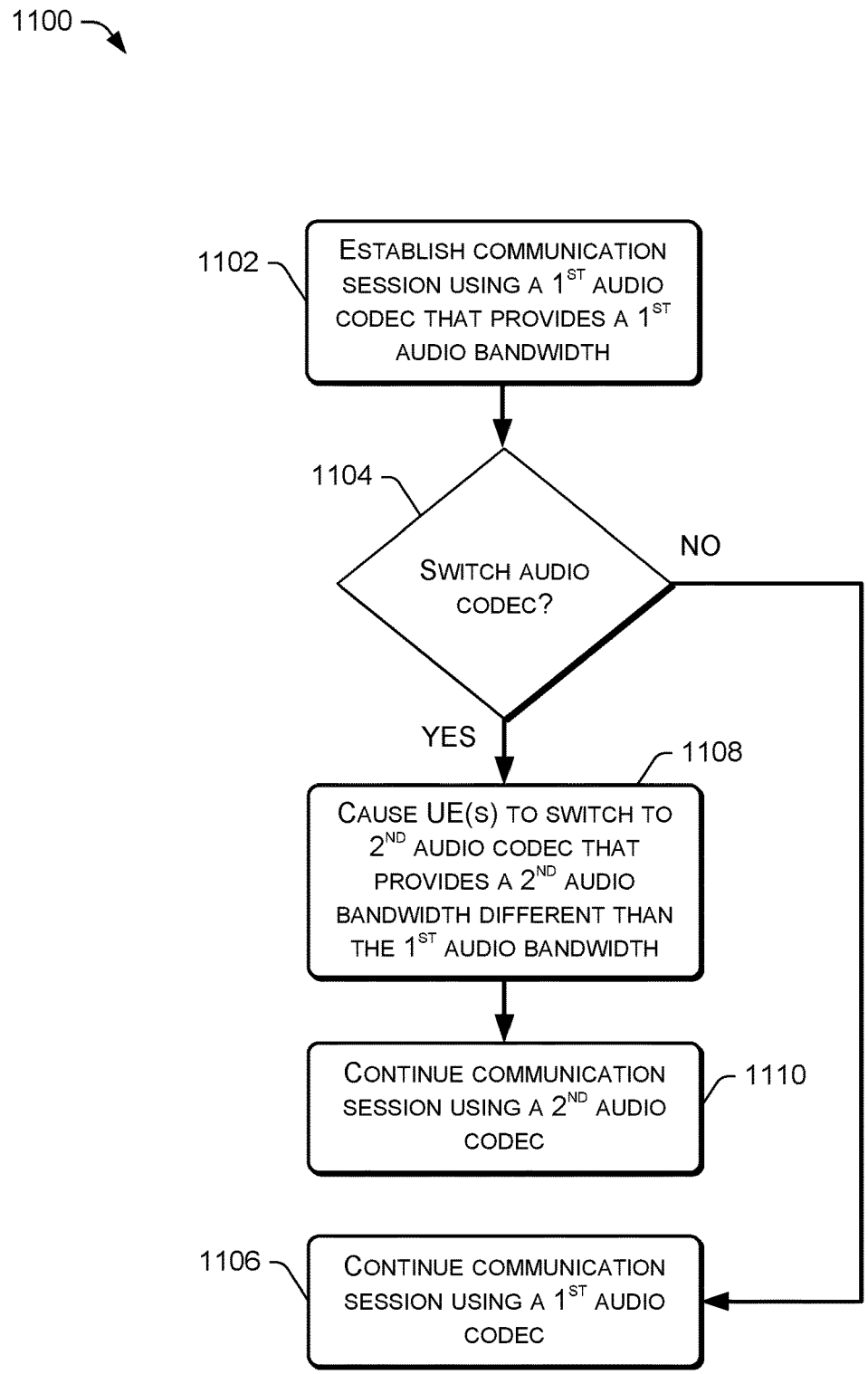
FIG. 11 illustrates a flowchart of an example network-side process for adaptively transitioning a UE(s) between using different audio codecs during an ongoing communication session, in accordance with various embodiments.

FIG. 11 illustrates a flowchart of an example network-side process 1100 for adaptively transitioning between audio codecs during an ongoing communication session, in accordance with various embodiments. For discussion purposes, reference is made to the previous figures in describing the process 1100.

At 1102, a network node(s) (e.g., a serving base station 108 and/or another network node) of a telecommunications network may establish, for a UE(s) 106, a communication session using a first audio codec that provides a first audio bandwidth. In some examples, the communication session is a voice call 102, such as a VoNR session. In some implementations, the network node may receive, at block 1102 from a UE 106, a session request, such as a SIP message using the SIP INVITE method, to request establishment of the call 102 with a terminating device, such as another UE. The session request received at 1102 may also include a SDP offer that specifies, among other things, particular codecs, including audio codecs, that are supported by the UE 106. The audio codecs supported by the UE 106 may be listed in order of preference, the first codec in the list being a preferred audio codec (or a default audio codec that is used by default if the terminating device also supports that audio codec, and if the RF conditions are good enough to use that audio codec). Accordingly, the first audio codec may be listed first in the list of supported audio codecs.

At 1104, the network node(s) may determine whether to switch to using a different audio codec during the ongoing communication session (e.g., the call 102). The determination to switch audio codecs at 1104 may be based on any of the techniques described herein. For example, the determination at 1104 may include receiving audio data 206 generated by the UE 106 during the communication session (e.g., the call 102) and determining, based at least in part on the audio data 206, that sound in the environment of the UE 106 includes frequencies outside of a range of frequencies 210 associated with a human voice, such as determining that music is being played in the environment of the UE 106. The network node(s) may use any of the techniques described herein for making such a determination, such as machine learning and/or artificial intelligence algorithms. For example, the network node(s) may provide the audio data 206 as input to a trained machine learning model(s), and the trained machine learning model(s) may generate, as output, a probability that a source of at least some of the sound is not a human voice (e.g., that music is playing in the background of the UE 106). As another example, the determination at 1104 may include determining whether a value(s) indicative of a RF condition(s) associated with the serving base station 108 is/are less than a threshold value(s). Additionally, or alternatively, since the network node(s) has access to data that the UE 106 may not have access to, the network node(s), at 1104, may determine whether a value indicative of network congestion and/or a value indicative of packet delay associated with the serving base station 108 is equal to or greater than a threshold value(s). These parameters (e.g., congestion, delay, etc.) may influence the decision to switch to a different audio codec.

If the network node(s) determines to refrain from switching to a different audio codec, the process 1100 may follow the NO route from block 1104 to block 1106, where the network node(s) continues the communication session (e.g., the voice call 102) for the UE(s) 106 using the first audio codec. If the network node(s) determines to switch to a different audio codec, the process 1100 may follow the YES route from block 1104 to block 1108, where the network node(s) may cause the UE(s) 106 to switch to using a second audio codec that provides a second audio bandwidth different than the first audio bandwidth. In some implementations, the network node(s) may send an instruction to the UE 106 involved in the communication session to switch audio codecs, and the UE 106 may initiate the transition by sending a message to the serving base station 108 to transition to the second audio codec, as described herein. In other implementations, the network node(s) may initiate the transition by instructing both UEs involved in the communication session to switch audio codecs, and the UEs 106 may switch to using the second audio codec.

At 1110, the network node(s) may continue the communication session (e.g., the call 102) using the second audio codec. If upgrading to a greater audio bandwidth, the first audio codec may be at least one of the EVS-NB codec, the EVS-WB codec, or the EVS-SWB codec 114, and the second audio codec may be the EVS-FB codec 118. If downgrading, the first audio codec may be the EVS-FB codec 118 and the second audio codec may be at least one of the EVS-NB codec, the EVS-WB codec, or the EVS-SWB codec 114.

Figure 12:
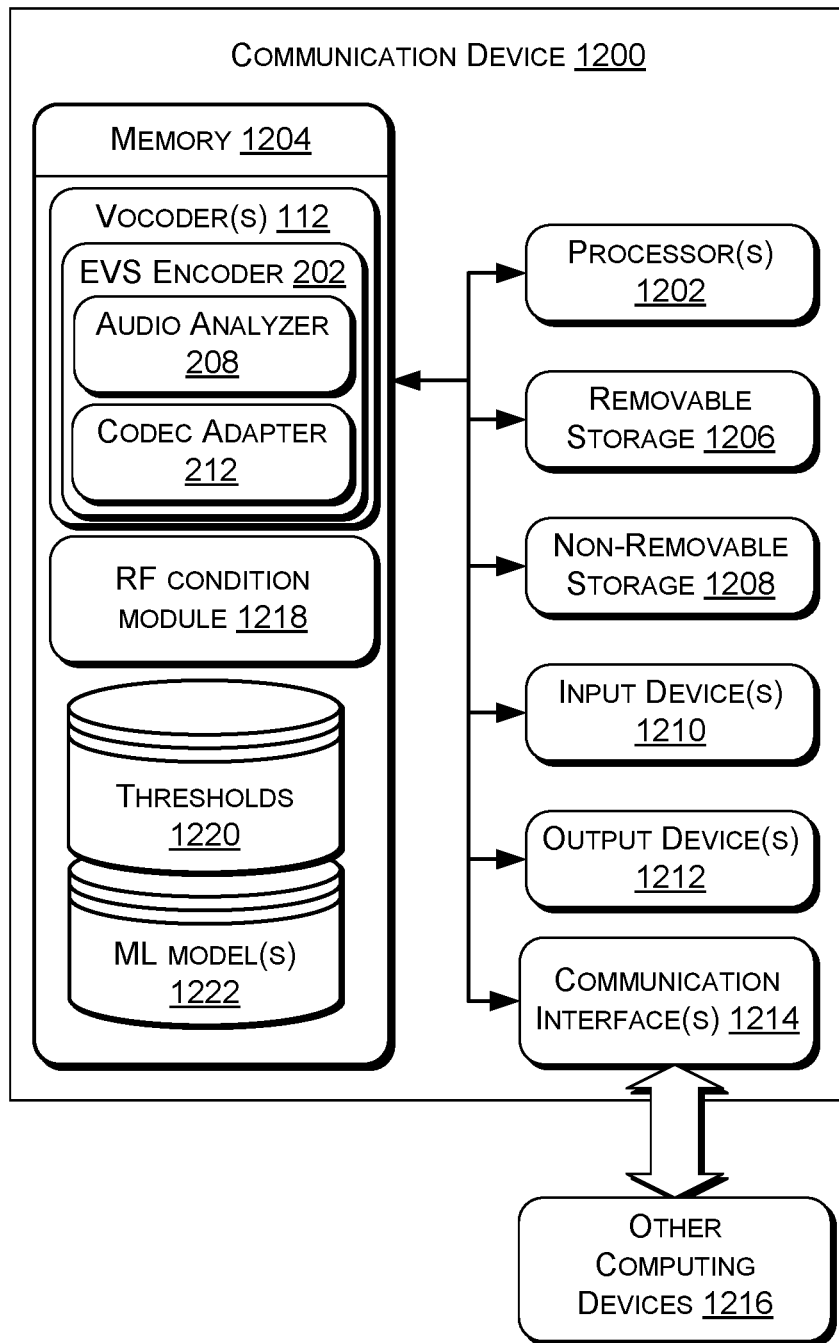
FIG. 12 is a block diagram of an example communication device configured to perform the techniques and processes described herein, in accordance with various embodiments.

FIG. 12 is a block diagram of an example communication device 1200 configured to perform the techniques and processes described herein, in accordance with various embodiments. The communication device 1200 may represent a UE, such as the UE 106 described herein, or the communication device 1200 may represent a network node that may implement at least some of the techniques and processes described herein. As shown in FIG. 12, the communication device 1200 may include one or more processors 1202 and one or more forms of computer-readable memory 1204. The communication device 1200 may also include additional storage devices. Such additional storage may include removable storage 1206 and/or non-removable storage 1208.

In various embodiments, the computer-readable memory 1204 comprises non-transitory computer-readable memory 1204 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 1204 may also be described as computer storage media and may include volatile and nonvolatile, removable and non-removable media implemented in any method or technology for storage of information, such as computer readable instructions, data structures, program modules, or other data. Computer-readable memory 1204, removable storage 1206 and non-removable storage 1208 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the communication device 1200. Any such computer-readable storage media may be part of the communication device 1200.

The communication device 1200 may further include input devices 1210 (e.g., a touch screen, keypad, keyboard, mouse, pointer, microphone 200, etc.) and output devices 1212 (e.g., a display, printer, speaker, etc.) communicatively coupled to the processor(s) 1202 and the computer-readable memory 1204. The communication device 1200 may further include a communications interface(s) 1214 (e.g., the communications interface(s) 204) that allows the communication device 1200 to communicate with other computing devices 1216 such as via a network(s) (e.g., a telecommunications network, cellular network, and/or IMS network). The communications interface(s) 1214 may facilitate transmitting and receiving wired and/or wireless signals over any suitable communications/data technology, standard, or protocol, as described herein. For example, the communications interface(s) 1214 can comprise one or more of a cellular radio, a wireless (e.g., IEEE 802.1x-based) interface, a Bluetooth® interface, and so on. In some embodiments, the communications interface(s) 1214 may include RF circuitry that allows the communication device 1200 to transition between different radio access technologies (RATs), such as transitioning between communication with a 5G NR RAT, a 4G LTE RAT and other legacy RATs (e.g., 3G/2G). The communications interface(s) 1214 may further enable the communication device 1200 to communicate over circuit-switch domains and/or packet-switch domains.

In some embodiments, the computer-readable memory 1204 may include the vocoder 112, which may include the EVS encoder 202, which may include the audio analyzer 208 and the codec adapter 212, as described above. In addition, the memory 1204 may include a RF condition module 1218 configured to determine one or more RF conditions (and/or values thereof), such as RSSI, RSRP, RSRQ, etc., as described above for implementing the techniques and processes described herein. One or more of these components of the communication device 1200 may be configured to access thresholds 1220, such as a RSSI threshold(s)), RSRP threshold(s), and/or RSRQ threshold(s), and/or frequency thresholds (e.g., a frequency range(s) 210), as described herein. One or more of these components of the communication device 1200 may be further be configured to access one or more trained machine learning model(s) 1222, as described herein, such as a model(s) 1222 configured to determine non-vocal frequencies (e.g., music) in an environment of a UE.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A computer-implemented method comprising:
   establishing, by a user equipment (UE), and via a serving base station, a voice call using a first Enhanced Voice Services (EVS) audio codec that provides a first audio bandwidth;
   generating, by the UE, and during the voice call, audio data based on sound in an environment of the UE;
   determining, by the UE, and based at least in part on an analysis of the audio data, that music is being played in the environment;
   outputting, via the UE, a user prompt indicating that the UE detected background music and associated with transitioning from using the first EVS audio codec to using a second EVS audio codec that provides a second audio bandwidth greater than the first audio bandwidth;
   receiving user input via the UE to transition from using the first EVS audio codec to using the second EVS audio codec;
   sending, by the UE, and based at least in part on the determining that the music is being played in the environment, a message to the serving base station for transitioning from using the first EVS audio codec to using the second EVS audio codec, wherein the sending of the message occurs in response to the receiving of the user input; and
   continuing, by the UE, and via the serving base station, the voice call using the second EVS audio codec.

2. The computer-implemented method of claim 1, wherein the second EVS audio codec is an EVS Full Band (EVS-FB) codec.

3. The computer-implemented method of claim 1, further comprising, after the continuing the voice call using the second EVS audio codec:
   generating, by the UE, and during the voice call, second audio data based on additional sound in the environment of the UE;
   determining, by the UE, and based at least in part on an analysis of the second audio data, that the music is no longer being played in the environment;
   sending, by the UE, and based at least in part on the determining that the music is no longer being played in the environment, a second message to the serving base station for transitioning from using the second EVS audio codec to using the first EVS audio codec; and continuing, by the UE, and via the serving base station, the voice call using the first EVS audio codec.

4. The computer-implemented method of claim 3, further comprising, in response to the determining that the music is no longer being played in the environment:

outputting, via the UE, a second user prompt indicating that the UE has ceased detecting background music and associated with transitioning from using the second EVS audio codec to using the first EVS audio codec; and receiving second user input via the UE to transition from using the second EVS audio codec to using the first EVS audio codec, wherein the sending of the second message occurs in response to the receiving of the second user input.

5. The computer-implemented method of claim 1, further comprising:

determining, by the UE, and during the voice call, that a value indicative of a radio frequency (RF) condition is equal to or greater than a threshold value, wherein the sending of the message is further based on the determining that the value indicative of the RF condition is equal to or greater than the threshold value.

6. A user equipment (UE) comprising:

a processor; and memory storing computer-executable instructions that, when executed by the processor, cause the UE to:

establish, via a serving base station, a communication session using a first audio codec that provides a first audio bandwidth;

generate, during the communication session, audio data based on sound in an environment of the UE;

determine, based at least in part on the audio data, that the sound includes frequencies outside of a range of frequencies associated with a human voice;

output a user prompt associated with transitioning from using the first audio codec to using a second audio codec that provides a second audio bandwidth greater than the first audio bandwidth;

receive user input to transition from using the first audio codec to using the second audio codec;

send, based at least in part on determining that the sound includes the frequencies outside of the range of frequencies associated with the human voice, a message to the serving base station for transitioning from using the first audio codec to using the second audio codec, wherein sending the message occurs in response to receiving the user input; and continue, via the serving base station, the communication session using the second audio codec.

7. The UE of claim 6, wherein the second audio codec is an Enhanced Voice Services Full Band (EVS-FB) codec.

8. The UE of claim 6, wherein:

the user prompt requests a selection of a bit rate among multiple available bit rates to use with the second audio codec;

receiving the user input comprises receiving the selection of the bit rate as a selected bit rate; and continuing the communication session using the second audio codec comprises using the second audio codec at the selected bit rate.

9. The UE of claim 6, wherein the message includes a capability indicator indicating that the UE supports the second audio codec, and wherein continuing the communication session using the second audio codec is based at least in part on a second UE involved in the communication session also supporting the second audio codec.

10. The UE of claim 6, wherein determining that the sound includes the frequencies outside of the range of frequencies associated with the human voice comprises determining that music is being played in the environment.

11. The UE of claim 10, wherein the determining that the music is being played in the environment comprises:

providing the audio data as input to a trained machine learning model; and generating, as output from the trained machine learning model, a probability that a source of the sound is not the human voice.

12. A computer-implemented method comprising:

establishing, by a user equipment (UE), and via a serving base station, a communication session using a first audio codec that provides a first audio bandwidth;

generating, by the UE, and during the communication session, audio data based on sound in an environment of the UE;

determining, by the UE, and based at least in part on the audio data, that the sound includes frequencies outside of a range of frequencies associated with a human voice;

output a user prompt associated with transitioning from using the first audio codec to using a second audio codec that provides a second audio bandwidth greater than the first audio bandwidth;

receive user input to transition from using the first audio codec to using the second audio codec;

sending, by the UE, and based at least in part on determining that the sound includes the frequencies outside of the range of frequencies associated with the human voice, a message to the serving base station for transitioning from using the first audio codec to using the second audio codec, wherein sending the message occurs in response to receiving the user input; and continuing, by the UE, and via the serving base station, the communication session using the second audio codec.

13. The computer-implemented method of claim 12, wherein:

the first audio codec is at least one of:

an Enhanced Voice Services Wideband (EVS-WB) codec; or an Enhanced Voice Services Super Wideband (EVS-SWB) codec; and the second audio codec is an Enhanced Voice Services Full Band (EVS-FB) codec.

14. The computer-implemented method of claim 12, further comprising:

determining, by the UE, and during the communication session, that a value indicative of a radio frequency (RF) condition is equal to or greater than a threshold value, wherein the sending of the message is further based on the determining that the value indicative of the RF condition is equal to or greater than the threshold value.

15. The computer-implemented method of claim 12, wherein the communication session is established using the first audio codec as a default codec.

16. The computer-implemented method of claim 12, wherein the determining that the sound includes the frequencies outside of the range of frequencies associated with the human voice comprises determining that music is being played in the environment.

17. The computer-implemented method of claim 16, further comprising, after the continuing the communication session using the second audio codec:
- generating, by the UE, and during the communication session, second audio data based on additional sound in the environment of the UE;
- determining, by the UE, and based at least in part on the second audio data, that the music is no longer being played in the environment;
- sending, by the UE, and based at least in part on the determining that the music is no longer being played in the environment, a second message to the serving base station for transitioning from using the second audio codec to using the first audio codec; and
- continuing, by the UE, and via the serving base station, the communication session using the first audio codec.

* * * * *